(12) United States Patent
Xu et al.

(10) Patent No.: US 9,794,022 B2
(45) Date of Patent: Oct. 17, 2017

(54) MODULATION PROCESSING METHOD AND DEVICE

(71) Applicant: ZTE CORPORATION, Shenzhen, Guangdong Province (CN)

(72) Inventors: Jun Xu, Shenzhen (CN); Bo Dai, Shenzhen (CN); Zewei Chen, Shenzhen (CN); Yu Ngok Li, Shenzhen (CN); Junfeng Zhang, Shenzhen (CN)

(73) Assignee: XI'AN ZHONGXING NEW SOFTWARE CO., LTD. (CN)

( * ) Notice: Subject to any disclaimer, the term of this patent is extended or adjusted under 35 U.S.C. 154(b) by 115 days.

(21) Appl. No.: 14/761,899

(22) PCT Filed: Oct. 30, 2013

(86) PCT No.: PCT/CN2013/086202
§ 371 (c)(1),
(2) Date: Jul. 17, 2015

(87) PCT Pub. No.: WO2014/110931
PCT Pub. Date: Jul. 24, 2014

(65) Prior Publication Data
US 2015/0372784 A1 Dec. 24, 2015

(30) Foreign Application Priority Data
Jan. 18, 2013 (CN) .......................... 2013 1 0019608

(51) Int. Cl.
*H04L 1/00* (2006.01)
*H04L 27/36* (2006.01)
(Continued)

(52) U.S. Cl.
CPC ......... *H04L 1/0004* (2013.01); *H04B 7/0626* (2013.01); *H04B 7/0632* (2013.01);
(Continued)

(58) Field of Classification Search
None
See application file for complete search history.

(56) References Cited

U.S. PATENT DOCUMENTS

| 8,265,128 B2 * | 9/2012 | Yu | H04B 7/026 370/315 |
| 9,407,417 B2 * | 8/2016 | Chen | H04L 1/0003 |

(Continued)

FOREIGN PATENT DOCUMENTS

| CN | 101272613 A | 9/2008 |
| CN | 102487314 A | 6/2012 |

(Continued)

OTHER PUBLICATIONS

Ericsson "CQI Tables for Support of 64QAM for HSDPA" 3GPP TSG-RAN WG1 Meeting #48, St. Louis, MO, USA, Feb. 12-16, 2007, Tdoc R1-071083.
(Continued)

*Primary Examiner* — Min Jung
(74) *Attorney, Agent, or Firm* — Plumsea Law Group, LLC

(57) ABSTRACT

A modulation processing method, a UE and a base station are disclosed; wherein, the base station transmits a high-layer configuration signaling to the UE, wherein the high-layer configuration signaling is used to indicate whether to support a high-order Quadrature Amplitude Modulation (QAM) modulation scheme, wherein the high-order QAM modulation scheme is a modulation scheme of M QAM, wherein M is a number greater than 64. With a high-layer configuration signaling indicating whether to support the high-order QAM, the high-order QAM modulation scheme is supported on the basis of being compatible with existing wireless transmission networks, and the peak data rate and the spectral efficiency are improved

44 Claims, 3 Drawing Sheets

(51) Int. Cl.
*H04B 7/06* (2006.01)
*H04L 27/34* (2006.01)

(52) U.S. Cl.
CPC ............ *H04L 1/001* (2013.01); *H04L 1/0016* (2013.01); *H04L 1/0025* (2013.01); *H04L 1/0026* (2013.01); *H04L 27/3405* (2013.01); *H04L 27/36* (2013.01)

(56) References Cited

U.S. PATENT DOCUMENTS

| | | |
|---|---|---|
| 2007/0259671 A1 | 11/2007 | Cheng et al. |
| 2009/0161613 A1 | 6/2009 | Kent et al. |
| 2012/0008517 A1 | 1/2012 | Imamura et al. |
| 2012/0039410 A1 | 2/2012 | Feher |
| 2013/0077514 A1 | 3/2013 | Dinan |
| 2015/0103760 A1 | 4/2015 | Zhang et al. |
| 2015/0289237 A1* | 10/2015 | Kim .................. H04L 27/26 370/329 |

FOREIGN PATENT DOCUMENTS

| | | |
|---|---|---|
| CN | 102624481 A | 8/2012 |
| CN | 102624501 A | 8/2012 |
| EP | 1901491 A1 | 3/2008 |
| KR | 20080045137 A | 5/2008 |
| KR | 20110036712 A | 4/2011 |
| RU | 2010129927 A | 1/2012 |
| WO | 2010086969 A1 | 8/2010 |
| WO | 2012119549 A1 | 9/2012 |
| WO | 2014109915 A1 | 7/2014 |

OTHER PUBLICATIONS

HTC "On Small Cell Enhancement for Improved Spectral Efficiency" 3GPP TSG RAN WG1 Meeting #72, St. Julian's, Malta, Jan. 28-Feb. 1, 2013, R1-130311.
Supplementary Partial European Search Report issued Oct. 27, 2015 in European Patent Application No. EP13872027.1.
Jim Zyren: "Overview of the 3GPP Long Term Evolution Physical Layer" Freescale Semiconductor, Inc., Jul. 2007, pp. 1-23, retrieved on Apr. 26, 2016 from https://www.nxp.com/files/wireless_comm/doc/white_paper/3GPPEVOLUTIONWP.pdf.
Examination Report of Australian Patent Application No. 2013373901 dated Apr. 29, 2016.
ZTE: "Consideration on high order modulation for small cell", 3GPP TSG-RAN WG1 Meeting #72, St Julian's, Malta Jan. 28-Feb. 1, 2013, R1-130136.
Japanese Office Action dated Jul. 26, 2016 in Patent Application No. 2015-552982.
Korean Office Action issued Oct. 14, 2016 for Korean Patent Application No. 10-2015-7019700.
Russian Office Action issued Nov. 7, 2016 for Russian Patent Application No. 2015132033.
3GPP TSG RAN WG1 Meeting Notes #69, R1-123062, Prague, Czech Republic, May 21-25, 2012 (14pp).
CMCC: "36.213CR for Additional special subframe", 3GPP Draft; RI-123043 36213 CR0380R1 (REL-11,B) Final, 3rd Generation Partnership Project (3GPP), Mobile Competence Centre.
European Search Report issued Feb. 2, 2016 in European Patent Application No. 13872027.1.

* cited by examiner

MODULATION PROCESSING METHOD AND DEVICE

CROSS-REFERENCE TO RELATED APPLICATION(S)

This application is the U.S. National Phase application of PCT application number PCT/CN2013/086202 having a PCT filing date of Oct. 30, 2013, which claims priority of Chinese patent application 201310019608.4 filed on Jan. 18, 2013, the disclosures of which are hereby incorporated by reference.

TECHNICAL FIELD

The present document relates to the field of mobile wireless communications, and more particularly, to a modulation processing method, a user equipment (UE) and a base station in a wireless communication system.

BACKGROUND OF THE INVENTION

In the mobile communication system, due to the time-varying characteristic of the wireless fading channel, the communication process has a lot of uncertainties, and on one hand, in order to improve the system throughput, a high-order modulation and a low redundancy error correcting code with a relatively high transmission rate are used for the communication, therefore the system throughput indeed improves significantly when the signal to noise ratio of the wireless fading channel is relatively ideal, however, when the channel is in deep fading, it cannot guarantee a reliable and stable communication, and on the other hand, in order to ensure reliability of the communication, a low order modulation and a high redundancy error correcting code with relatively low transmission rate are used for the communication, that is, it ensures a reliable and stable communication when the wireless channel is in deep fading, however, when the signal to noise ratio of the channel is relatively high, due to a relatively low transmission rate, the increase of system throughput is restricted, thereby resulting in a waste of resources, and in the early development of mobile communication technology, people fights the wireless fading channel time-varying characteristic only by increasing the transmission power of the transmitter and using a low-order and large redundancy modulation and coding method to ensure the communication quality of the system when the channel is in deep fading, and how to increase the system throughput has not been considered, and along with improvement in technology, there has appeared technology which adaptively adjusts its transmission power, modulation and coding scheme and data frame length based on the channel state to overcome the channel time-varying characteristic, so as to obtain the best communication effect, and the technology is known as adaptive coding and modulation technology, which is the most typical link adaptation technology.

In the Long Term Evolution (LTE) system, the control signaling which needs to be transmitted in the uplink has Acknowledgement/Negative Acknowledgement (ACK/NACK), and three forms which reflect the channel state information (CSI) of the downlink physical channel: channel quality indication (CQI), Pre-coding Matrix Indicator (PMI), and Rank Indicator (RI).

The CQI is an index used to measure the quality of the downlink channel. In the 36-213 protocols, the CQI is indicated with values of integers from 0 to 15, which respectively represent different CQI levels, and different CQIs correspond to respective Modulation and Coding Schemes (MCS), see Table 1. The CQI grade selection should follow the following guidelines:

TABLE 1

| CQI index | Modulation | Code rate × 1024 | Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The Quadrature Amplitude Modulation (QAM) in Table 1 represents the quadrature amplitude modulation, and the Quadrature Phase Shift Keying (QPSK) represents the quadrature phase shift keying which is a digital modulation scheme.

The selected CQI level should be such that the block error rate of the Physical Downlink Shared Channel (PDSCH) transport blocks corresponding to the CQI under the corresponding MCS does not exceed 0.1.

Based on one non-limiting detection interval between the frequency domain and the time domain, the User Equipment (UE) will obtain the highest CQI value which corresponds to each maximum CQI value reported in the uplink subframe n, and the CQI index is in the range of 1-15, and meets the following condition, and if the CQI index 1 does not meet the condition, the CQI index is 0: the error rate of a single PDSCH transport block does not exceed 0.1 when being received, the PDSCH transport block comprises joint information: modulation scheme and transport block size, which corresponds to one CQI index and a group of occupied downlink physical resource blocks, that is the CQI reference resource. Wherein, the maximum CQI value is the maximum CQI value when ensuring that the Block Error Ratio (BLER) is not greater than 0.1, and it helps to control the resource allocation. Generally, the smaller the CQI value is, more resources will be occupied, and the BLER performance is better. For the joint information corresponding to one CQI index and having the transport block size and modulation scheme, if: the joint information transmitted by the PDSCH in the CQI reference resource according to the related transport block size can be notified with signaling, in addition:

the modulation scheme is characterized with the CQI index and uses the joint information including the transport block size and the modulation scheme in the reference resource, and the effective channel coding rate generated by the modulation scheme is the most closing effective channel coding rate which can be characterized with the CQI index. When there is more than one of the joint information and all of the join information can generate similarly closing effective channel encoding rate characterized by the CQI index, the joint information having the minimum transport block size is used.

Each CQI index corresponds to one modulation scheme and transport block size, and the corresponding relationship between the transport block size and the number of physical resource blocks (NPRB) can be showed with a table. The coding rate can be calculated according to the transport block size and the NPRB.

In the LTE system, the ACK/NACK is transmitted on the physical uplink control channel (PUCCH) in the PUCCH format 1/1a/1b, if the User Equipment (UE) needs to transmit uplink data, the data are transmitted on the physical uplink shared channel (PUSCH), the CQI/PMI, RI feedback may be a periodic or a periodic feedback, and the specific feedback is shown in Table 2:

TABLE 2 uplink physical channels corresponding to periodic feedback and a periodic feedback

| Scheduling pattern | Periodic CQI report channel | Aperiodic CQI report channel |
|---|---|---|
| Frequency non-selective | PUCCH | |
| Frequency selective | PUCCH | PUSCH |

Wherein, for the periodic CQI/PMI, RI feedback, if the UE does not need to transmit the uplink data, the periodic CQI/PMI, RI feedback is transmitted on the PUCCH in PUCCH format 2/2a/2b, if the UE needs to transmit the uplink data, the CQI/PMI, RI is transmitted on the PUSCH; the aperiodic CQI/PMI, RI feedback is only transmitted on the PUSCH.

The Long-Term Evolution (referred to as LTE) Release 8 standard defines the following three downlink physical control channels: Physical Control Format Indicator Channel (referred to as PCFICH), Physical Hybrid Automatic Retransmission Request Indicator Channel (referred to as PHICH) and Physical Downlink Control Channel (referred to as PDCCH). Wherein the PDCCH is used to carry Downlink Control Information (referred to as DCI), comprising: uplink, downlink scheduling information, and uplink power control information. The DCI format is divided into the following: DCI format 0, DCI format 1, DCI format 1A, DCI format 1B, DCI format 1C, DCI format 1 D, DCI format 2, DCI format 2A, DCI format 2B, DCI format 2C, DCI format 2D, DCI format 3, and the DCI format 3A, and the like;

In the LTE, downlink control information such as the coding and modulation scheme, the resource allocation position and the HARQ information need to be defined in the downlink control signaling. Wherein, the downlink scheduling of the base station determines the coding and modulation scheme, and especially, the protocol defines a modulation and transport block size table, and each row of the table corresponds to one MCS index, for each MCS index, the modulation and transport block size table defines one combination of modulation scheme and code rate, and the specific table can refer to the LTE 36.213 standard, and one MCS index essentially corresponds to one spectral efficiency, the selection for the MCS index needs to refer to the desired CQI value, generally the base station needs to consider the spectral efficiencies of the two parties in the implementation. The base station determines the MCS index and also needs to determine the resource allocation information, and the resource allocation provides the number of physical resource blocks (NPRB) which need to be occupied in the downlink transmission, the LTE standard also provides a transport block size (TBS) table, and the table defines the TBS size under the condition of a given MCS index and the number of physical resource blocks (NPRB), and with these coding and modulation parameters, the downlink coding and modulation can be performed.

In Release 10 (R10), the UE is semi-statically configured to receive the PDSCH data transmission through the high-layer signaling based on one of the following transmission modes and according to the PDCCH indication of UE-Specific search space:
Transmission Mode 1: Single-antenna port; port 0
Transmission Mode 2: Transmit diversity
Transmission Mode 3: Open-loop spatial multiplexing
Transmission Mode 4: Closed-loop spatial multiplexing
Transmission Mode 5: Multi-user MIMO
Transmission Mode 6: Closed-loop Rank=1 precoding
Transmission Mode 7: Single-antenna port; port 5
Transmission Mode 8: dual-stream transmission, namely double-stream beamforming
Transmission Mode 9: Up to 8 layer transmission
Transmission Mode 10: up to 8 layer transmission which supports the COMP function.

After experiencing several versions such as R8/9/10, the Long Term Evolution (referred to as LTE) system gradually and accurately studied the R11 technology. At present, some R8 products began to gradually become commercial, the R9 and the R10 are to be further product planned.

A modulation and coding scheme of up to 64QAM is supported in the uplink and downlink in the existing standards, and along with the development of heterogeneous networks, the small cell requires higher data transmission rate and higher system spectral efficiency, but the existing standards cannot meet this requirement.

SUMMARY

The embodiment of the present document provides a modulation processing method, a user equipment (UE) and a base station to solve the problem that existing communication standards cannot meet the requirements.

To solve the abovementioned technical problem, the embodiment of the present document provides a coding and modulation processing method, and the method comprises:
a base station transmitting a high-layer configuration signaling to a user equipment (UE), wherein the high-layer configuration signaling is used to indicate whether to support a high-order Quadrature Amplitude Modulation (QAM) modulation scheme, the high-order QAM modulation scheme is a modulation scheme of M QAM, wherein M is a number greater than 64.

Preferably, after the base station transmits the high-layer configuration signaling, the method further comprises:
the base station receiving channel state information of the UE, wherein the channel state information at least comprises channel quality indication (CQI) information, and when the high-layer configuration signaling indicates not supporting the high-order QAM modulation scheme, the CQI information is obtained based on a first CQI table which does not support the high-order QAM modulation scheme, and when the high-layer configuration signaling indicates supporting the high-order QAM modulation scheme, the CQI information is obtained based on a second CQI table which supports the high-order QAM modulation scheme.

Preferably, after the base station transmits the high-layer configuration signaling, the method further comprises:
the base station transmitting a downlink control signaling to the UE, wherein the downlink control signaling at least comprises a modulation and coding scheme field ($I_{MCS}$), when the high-layer configuration signaling indicates not supporting the high-order QAM modulation scheme, then the modulation and coding scheme field ($I_{MCS}$) is determined based on a first modulation and transport block size (TBS) index table which does not support the high-order QAM modulation scheme; when the high-layer configuration signaling indicates supporting the high-order QAM modulation scheme, in combination with predefined information, it is to determine whether the modulation and coding scheme field ($I_{MCS}$) is determined based on a second modulation and TBS index table which supports the high-order QAM modulation scheme.

To solve the above-mentioned technical problem, the embodiment of the present document further provides a coding and modulation processing method, and the method comprises:

a UE receiving a high-layer configuration signaling transmitted by a base station, wherein the high-layer configuration signaling is used to indicate whether to support a high-order Quadrature Amplitude Modulation (QAM) modulation scheme, the high-order QAM modulation scheme is a modulation scheme of Mgreater-than-64 QAM, wherein M is a number greater than 64.

To solve the above-mentioned technical problem, the embodiment of the present document further provides a base station, and the base station comprises:

a configuration information transmitting unit, configured to transmit a high-layer configuration signaling to a UE, wherein the high-layer configuration signaling is used to indicate whether to support a high-order Quadrature Amplitude Modulation (QAM)modulation scheme , and the high-order QAM modulation scheme is a modulation scheme of Mgreater-than-64 QAM, wherein M is a number greater than 64.

To solve the abovementioned technical problem, the present document further provides a UE, and the UE comprises:

a configuration information receiving unit, configured to receive a high-layer configuration signaling transmitted by a base station, wherein the high-layer configuration signaling is used to indicate whether to support a high-order Quadrature Amplitude Modulation (QAM) modulation scheme , and the high-order QAM modulation scheme is a modulation scheme of Mgreater-than-64 QAM, wherein M is a number greater than 64.

The embodiment of the present document can be used to support the MQAM transmission and feedback very well, support the MQAM under the conditions of being compatible with existing systems, without increasing signaling overheads, and ensuring that the transmission and feedback are consistent, increase the system frequency efficiency and the data peak rate, and support using the 256QAM or not support the 256QAM through the semi-static switching, thus ensuring the use of 256QAM in reasonable environments, for example, the 256QAM can only be used in the small-cell environment.

PREFERRED EMBODIMENTS OF THE INVENTION

Figure 1:
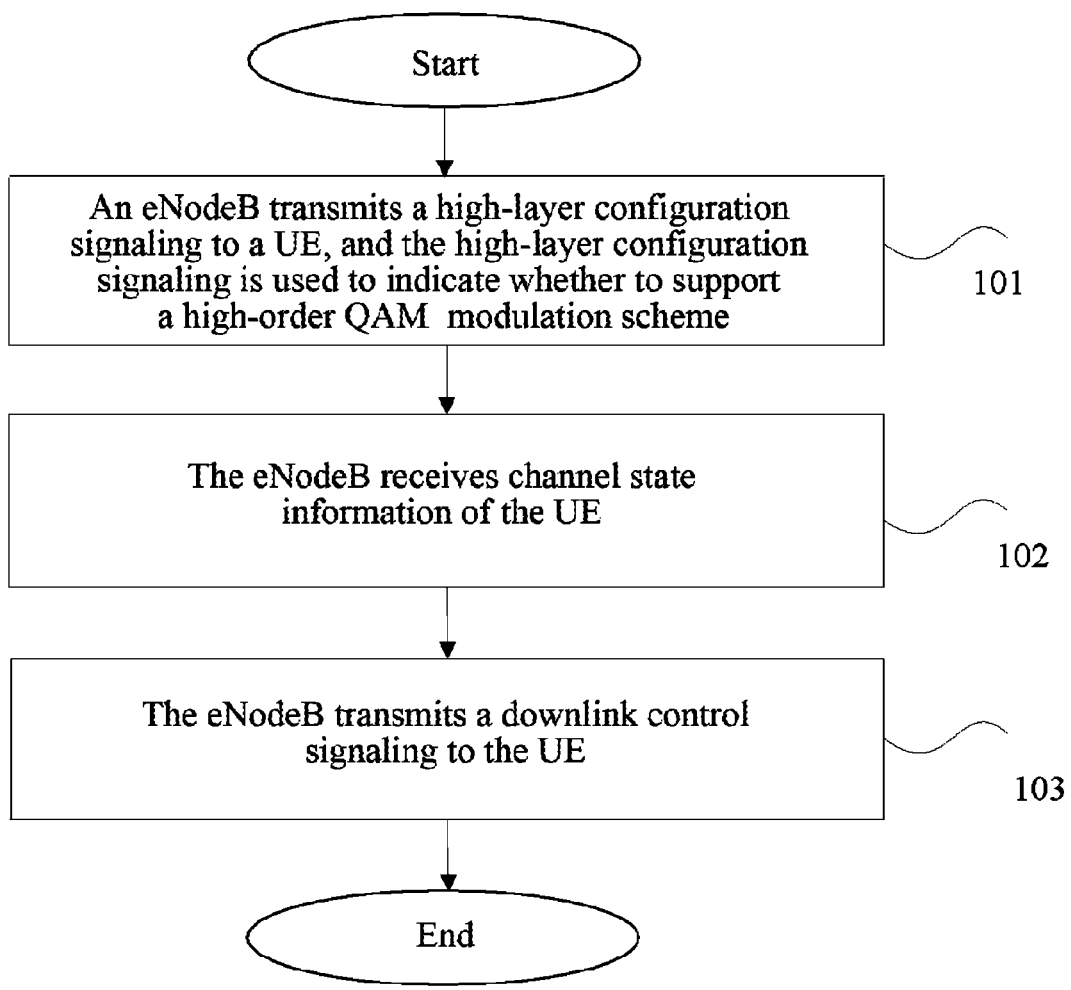
FIG. 1 is a schematic diagram of a modulation processing method applied to a base station in accordance with an embodiment of the present document.

Hereinafter, in conjunction with the accompanying drawings, the embodiments of the present document will be described in detail. It should be noted that, in the case of no conflict, embodiments and features in the embodiments in the present application can be combined randomly with each other.

Embodiment One

The present embodiment provides a modulation processing method, applied to an evolved NodeB (eNodeB), and comprising that:

an evolved NodeB (eNodeB) transmits a high-layer configuration signaling to a user equipment (UE), wherein the high-layer configuration signaling is used to indicate whether to support a high-order Quadrature Amplitude Modulation (QAM) modulation scheme, and the high-order QAM modulation scheme is a modulation scheme of Mgreater-than-64 QAM, wherein M is a number greater than 64.

In this specification, the high-order QAM is also called M QAM, wherein M is a positive integer greater than 64 and is a power of 2.

In the embodiment one, M=256, and M QAM is the 256QAM.

Alternatively, the high-layer configuration signaling may be a newly added high-layer configuration signaling or an existing high-layer configuration signaling, such as an existing high-layer configuration signaling which is used to indicate the transmission mode;

when the high-layer configuration signaling is new added, it is to predefine one or more transmission modes support transmitting the high-layer configuration signaling, while other modes do not support transmitting the high-layer configuration signaling, the eNodeB only transmits the high-layer configuration signaling when the transmission mode supports transmitting the high-layer configuration signaling.

Understandably, when using an existing high-layer configuration signaling, it is equivalent to use an implicit mode to indicate whether to support the high-order QAM modulation scheme. In order to achieve the purpose of implicit indication, both the high-layer configuration signaling sender and recipient, that is, both the eNodeB and the UE, predefines the corresponding a relationship between the explicit indication content (such as the transmission mode) and the implicit indication content (refer to whether to support the high-order QAM modulation scheme).

Alternatively, the high-layer configuration signaling which is used to indicate the transmission mode is used to achieve implicitly indicating whether to support the high-order QAM modulation scheme; for example, the eNodeB and the UE predefine one or more modes to support the MQAM, while other transmission modes do not support the MQAM;

Alternatively, the above-mentioned transmission modes which support the MQAM may be transmission mode 9, transmission mode 10, a newly defined transmission mode, or, all transmission modes, or only one or more specific transmission modes are newly defined;

Alternatively, M may also be 128, 256 or 1024.

The method of the present embodiment ensures to support or not support using the 256QAM with the semi-static switching, ensures to use the 256QAM in reasonable environments, for example, the 256QAM can only be used in the small-cell environment.

Embodiment Two

The present document provides a coding and modulation processing method, applied to an evolved NodeB (eNodeB), and comprising that:

the eNodeB transmits a high-layer configuration signaling to a user equipment (UE), wherein the high-layer configuration signaling is used to indicate whether to support a high-order Quadrature Amplitude Modulation (QAM) modulation scheme, and the high-order QAM (also known as M QAM) modulation scheme is a modulation scheme of Mgreater-than-64 QAM, wherein M is a number greater than 64.

On the basis of any of the above-mentioned high-layer configuration signaling implementations, the eNodeB receives channel state information of the UE, and the channel state information at least comprises channel quality indication (CQI) information, when the high-layer configuration signaling indicates not supporting the high-order QAM modulation scheme, the CQI information is obtained based on a first CQI table which does not support the high-order QAM modulation scheme, when the high-order configuration signaling indicates supporting the high-order QAM modulation scheme, the CQI information is obtained based on a second CQI table which supports the high-order QAM modulation scheme.

The code rate value r corresponding to the last combination of modulation and code rate in the second CQI table is a real number between 0.92 and 0.96, for example: r=0.93.

The first CQI table is the 4-bit CQI table in the LTE Release 8; the second CQI table has the following modes:

mode A1:

the second CQI table has 16 values, that is, the CQI is indicated with 4 bits, except the L2 combinations of modulation scheme and code rate, the L1 combinations of modulation scheme and code rate in the first CQI table in turn work as the first L1 combinations of modulation scheme and code rate in the second CQI table, and the next L2 combinations of modulation scheme and code rate in the second CQI table are combinations of greater-than-64 QAM and code rate; L1 and L2 are positive integers greater than 1, and L1+L2=15, and M is a number greater than 64;

the mode A1 can be any one of the following modes:

mode A11: except the first L2' combinations of modulation scheme and code rate, the L1' combinations of modulation scheme and code rate in the first CQI table in turn work as the first L1' combinations of modulation scheme and code rate in the second CQI table, and the next L2' combinations of modulation scheme and code rate in the second CQI table are combinations of M-than-64 QAM, wherein M is a number greater than 64;

the following is the second CQI table designed according to the mode A11, wherein L2'=2, L1'=13, as shown in Table 3:

TABLE 3

| CQI index | Modulation scheme | Code rate × 1024 | Spectral efficiency |
|---|---|---|---|
| 0 | | out of range | |
| 1 (formerly 3) | QPSK | 193 | 0.3770 |
| 2 (formerly 4) | QPSK | 308 | 0.6016 |
| 3 (formerly 5) | QPSK | 449 | 0.8770 |
| 4 (formerly 6) | QPSK | 602 | 1.1758 |
| 5 (formerly 7) | 16QAM | 378 | 1.4766 |
| 6 (formerly 8) | 16QAM | 490 | 1.9141 |
| 7 (formerly 9) | 16QAM | 616 | 2.4063 |
| 8 (formerly 10) | 64QAM | 466 | 2.7305 |
| 9 (formerly 11) | 64QAM | 567 | 3.3223 |
| 10 (formerly 12) | 64QAM | 666 | 3.9023 |
| 11 (formerly 13) | 64QAM | 772 | 4.5234 |
| 12 (formerly 14) | 64QAM | 873 | 5.1152 |
| 13 (formerly 15) | 64QAM | 948 | 5.5547 |
| 14 (new) | 256QAM | 844 | 6.5938 |
| 15 (new) | 256QAM | 952 | 7.4375 |

The CQI index "2 (formerly 4)" in the first row and fourth column of the above table indicates that the corresponding combination of modulation scheme and code rate when the CQI index is 2 is the same with the corresponding combination of modulation scheme and code rate when the CQI index is 4 in the former CQI table (that is, the first CQI table mentioned in this specification), the "15 (new)" in the last column indicates that the corresponding combination of modulation scheme and code rate when the CQI index is 15 is new with respect to the former CQI table. Similarly the method for reading the second CQI table is similar and will not be repeated in the following.

Mode A12: except the first L2' even-numbered combinations of modulation and code rate or odd-numbered combinations of modulation and code rate, the L1' combinations in the first CQI table in turn work as the first L1' combinations in the second CQI table, the last L2' combinations of modulation scheme and code rate in the second CQI table are combinations of QAM and code rate; wherein, in the first CQI table, the odd-numbered combinations of modulation scheme and code rate refer to the set of the 1st, 3rd, 5th, 7th, 9th, 11th and 13th combinations of modulation scheme and code rate, the even-numbered combinations of modulation scheme and code rate refer to the set of the 2nd,4th,6th,8th,10th,12th,14th combinations of modulation scheme and code rate, wherein M is a number greater than 64.

The following is the second CQI table designed according to the mode A12, wherein L2'=2, and L1'=13, and except the first two even numbered combinations of modulation and code rate, the other 13 combinations in the first CQI table in turn work as the first 13 combinations in the second CQI table. As shown in Table 4:

TABLE 4

| CQI index | Modulation scheme | Code rate × 1024 | Spectral efficiency |
|---|---|---|---|
| 0 | | out of range | |
| 1 (formerly 1) | QPSK | 78 | 0.1523 |
| 2 (formerly 3) | QPSK | 193 | 0.3770 |
| 3 (formerly 5) | QPSK | 449 | 0.8770 |
| 4 (formerly 6) | QPSK | 602 | 1.1758 |
| 5 (formerly 7) | 16QAM | 378 | 1.4766 |
| 6 (formerly 8) | 16QAM | 490 | 1.9141 |
| 7 (formerly 9) | 16QAM | 616 | 2.4063 |
| 8 (formerly 10) | 64QAM | 466 | 2.7305 |
| 9 (formerly 11) | 64QAM | 567 | 3.3223 |
| 10 (formerly 12) | 64QAM | 666 | 3.9023 |
| 11 (formerly 13) | 64QAM | 772 | 4.5234 |

TABLE 4-continued

| CQI index | Modulation scheme | Code rate × 1024 | Spectral efficiency |
|---|---|---|---|
| 12 (formerly 14) | 64QAM | 873 | 5.1152 |
| 13 (formerly 15) | 64QAM | 948 | 5.5547 |
| 14 (new) | 256QAM | 844 | 6.5938 |
| 15 (new) | 256QAM | 952 | 7.4375 |

Or, mode A2: in the second CQI table, the CQI has 16 or 32 values, any combination of modulation scheme and code rate in the second CQI table is different from all combinations of modulation scheme and code rate in the first CQI table; alternatively, the first combination of modulation scheme and code rate in the second CQI table is the same as the k-th combination of modulation scheme and code rate in the first CQI table, and other combinations of modulation scheme and code rate in the second CQI table are different from all combinations of modulation scheme and code rate in the first CQI table, k is a positive integer between 1 and 5; wherein, in the second CQI table, the first combination of modulation scheme and code rate refers to the second row in the second CQI table, and the corresponding CQI index is 1.

The following is the second CQI table designed with the mode A2, where k=1, the first combination of modulation scheme and code rate in the second CQI table is the same as the first combination of modulation scheme and code rate in the first CQI table, other combinations of modulation scheme and code rate in the second CQI table are different from all combinations of modulation scheme and code rate in the first CQI table. As shown in Table 5:

TABLE 5

| CQI index | Modulation | Code rate × 1024 | Spectral efficiency |
|---|---|---|---|
| 0 | | out of range | |
| 1 (formerly 1) | QPSK | 78 | 0.1523 |
| 2 | QPSK | 137 | 0.2676 |
| 3 | QPSK | 237 | 0.4629 |
| 4 | QPSK | 395 | 0.7715 |
| 5 | QPSK | 576 | 1.1250 |
| 6 | 16QAM | 380 | 1.4844 |
| 7 | 16QAM | 522 | 2.0391 |
| 8 | 16QAM | 672 | 2.6250 |
| 9 | 64QAM | 535 | 3.1348 |
| 10 | 64QAM | 655 | 3.8379 |
| 11 | 64QAM | 784 | 4.5938 |
| 12 | 64QAM | 899 | 5.2676 |
| 13 | 256QAM | 759 | 5.9297 |
| 14 | 256QAM | 868 | 6.7813 |
| 15 | 256QAM | 952 | 7.4375 |

Or, mode A3: the CQI in the second CQI table has 32 values, the first 13, 14 or 15 combinations in the odd-numbered combinations of modulation scheme and code rate in the second CQI table are the combinations of modulation scheme and code rate in the first CQI table.

The following is the second CQI table designed with the mode A3, wherein the first 14 combinations in the odd-numbered combinations of modulation scheme and code rate in the second CQI table are the combinations of modulation scheme and code rate in the first CQI table, as shown in Table 6:

TABLE 6

| CQI index | Modulation | Code rate × 1024 | Spectral efficiency |
|---|---|---|---|
| 0 | | out of range | |
| 1 (formerly 1) | QPSK | 78 | 0.1523 |
| 2 (formerly 2) | QPSK | 120 | 0.2344 |
| 3 (formerly 3) | QPSK | 193 | 0.3770 |
| 4 (new) | QPSK | 251 | 0.4902 |
| 5 (formerly 4) | QPSK | 308 | 0.6016 |
| 6 (new) | QPSK | 379 | 0.7402 |
| 7 (formerly 5) | QPSK | 449 | 0.8770 |
| 8 (new) | QPSK | 526 | 1.0273 |
| 9 (formerly 6) | QPSK | 602 | 1.1758 |
| 10 (new) | 16QAM | 340 | 1.3281 |
| 11 (formerly 7) | 16QAM | 378 | 1.4766 |
| 12 (new) | 16QAM | 434 | 1.6953 |
| 13 (formerly 8) | 16QAM | 490 | 1.9141 |
| 14 (new) | 16QAM | 553 | 2.1602 |
| 15 (formerly 9) | 16QAM | 616 | 2.4063 |
| 16 (new) | 64QAM | 438 | 2.5664 |
| 17 (formerly 10) | 64QAM | 466 | 2.7305 |
| 18 (new) | 64QAM | 517 | 3.0293 |
| 19 (formerly 11) | 64QAM | 567 | 3.3223 |
| 20 (new) | 64QAM | 616 | 3.6094 |
| 21 (formerly 12) | 64QAM | 666 | 3.9023 |
| 22 (new) | 64QAM | 719 | 4.2129 |
| 23 (formerly 13) | 64QAM | 772 | 4.5234 |
| 24 (new) | 64QAM | 822 | 4.8164 |
| 25 (formerly 14) | 64QAM | 873 | 5.1152 |
| 26 (new) | 64QAM | 911 | 5.3379 |
| 27 (formerly 15) | 64QAM | 948 | 5.5547 |
| 28 (new) | 256QAM | 779 | 6.0859 |
| 29 (new) | 256QAM | 844 | 6.5938 |
| 30 (new) | 256QAM | 903 | 7.0547 |
| 31 (new) | 256QAM | 952 | 7.4375 |

Embodiment Three

The modulation processing method embodiment of the embodiment three in accordance with the present document is applied to an eNodeB and comprises that:

an evolved NodeB (eNodeB) transmits a high-layer configuration signaling to a user equipment (UE), wherein the high-layer configuration signaling is used to indicate whether the supported modulation schemes comprise the high-order QAM modulation scheme. Wherein M is a positive integer greater than 64 and is a power of 2.

Alternatively, on the basis of any of the abovementioned high-layer configuration signaling implementations, the eNodeB transmits a downlink control signaling to the UE, and the downlink control signaling at least comprises a modulation and coding scheme field ( ), When the high-layer configuration signaling indicates not supporting the high-order QAM modulation scheme, the modulation and coding scheme field ( ) is determined based on the first modulation and transport block size (TBS) index table which does not support the high-order QAM modulation scheme; when the high-layer configuration signaling indicates supporting the high-order QAM modulation scheme, with combination of the predefined information, it is to determine whether the modulation and coding scheme field ( ) is determined based on the second modulation and TBS index table which supports the high-order QAM modulation scheme.

Alternatively, the predefined information is at least one of the following: a search space, a downlink control information format, a Cyclic Redundancy Check (CRC) scrambling mode of downlink control information.

Alternatively, the predefined information is a search space, and predefines that: when the high-layer configuration signaling indicates supporting the high-order QAM modulation scheme and it is in a public search space, the modulation and coding scheme field ( ) is determined based on the first modulation and transport block size (TBS) index table which does not support the high-order QAM modulation scheme, when the high-layer configuration signaling indicates supporting the high-order QAM modulation scheme and it is in the UE-specific search space, the modulation and coding scheme field ( ) is determined based on the second modulation and transport block size (TBS) index table which supports the high-order QAM modulation scheme;

or, the pre-defined information is the search space and the CRC scrambling mode corresponding to the downlink control information, and predefines that: when the high-order configuration signaling indicates supporting the high-order QAM modulation scheme and a Semi-Persistent Scheduling (SPS) Cell Radio Network Temporary Identifier (C-RNTI) scrambles CRC in a public search space or in a UE-specific search space, the modulation and coding scheme field ( ) is determined based on the first modulation and transport block size (TBS) index table which does not support the high-order QAM modulation scheme, when the high-layer configuration signaling indicates supporting the high-order QAM modulation scheme and a C-RNTI scrambles the CRC in the UE-specific search space, the modulation and coding scheme field ( ) is determined based on the second modulation and transport block size (TBS) index table which supports the high-order QAM modulation scheme.

Alternatively, the predefined information may also be the downlink control information format and predefines that: when the high-layer configuration signaling indicates supporting the high-order QAM modulation scheme and the downlink control information format is a format predefined as supporting the high-order QAM modulation scheme, then the modulation and coding scheme field ( ) is determined based on the second modulation and transport block size (TBS) index table which supports the high-order QAM modulation scheme, when the high-layer configuration signaling indicates not supporting the high-order QAM modulation scheme or the downlink control information format is a format predefined as not supporting the high-order QAM modulation scheme, the modulation and coding scheme field ( ) is determined based on the first modulation and transport block size (TBS) index table which does not support the high-order QAM modulation scheme.

For another example: it is to predefine that all downlink control information formats corresponding to the transmission modes which support the QAM modulation scheme support the high-order QAM modulation scheme, or only one of all the downlink control information formats corresponding to the transmission modes which support the QAM modulation scheme supports the high-order QAM modulation scheme.

Alternatively, the above-mentioned control information format supporting the MQAM may comprise at least one of the following: DCI Format 2C, DCI Format 2D, DCI Format 4, DCI Format 0, DCI Format 1A, DCI Format X (newly defined control information format);

Alternatively, the eNodeB transmits the downlink data based on the downlink control signaling.

Alternatively, the first modulation and TBS index table is the 5-bit modulation and TBS index table in the LTE Release 8; the second modulation and TBS index table uses one of the following modes:

mode B1: the second modulation and TBS index table has 32 values, that is, the MCS index is represented by 5 bits, except L2 combinations of modulation and TBS index, L1 combinations in the first modulation and TBS index table in turn work as the first 23 combinations in the second modulation scheme and TBS index table, the next L2-1 combinations following the first L1 combinations in the second modulation and TBS index table are combinations of MQAM and TBS index, the TBS indexes of the last L3 combinations in the second modulation and TBS index table are default; L1, L2 and L3 are positive integers greater than 1, and L1+L2+L3−1=32, and M is a number greater than 64;

Alternatively, the mode B1 may be the mode B11 or B12, wherein:

mode B11: except first L2' combinations of modulation and TBS index, L1'combinations in the first modulation and TBS index table in turn work as the first L1'combinations in the second modulation scheme and TBS index table, next L2'-1 combinations in the second modulation and TBS index table are combinations of M QAM and TBS index, the TBS indexes of the last L3' combinations in the second modulation and TBS index table are default; L1', L2' and L3' are positive integers greater than 1, and M is a number greater than 64;

According to the mode B11, if L2'=6, L1'=23, L3'=4, then the second modulation and TBS index table may be designed as shown in Table 7:

TABLE 7

| MCS index $I_{MCS}$ | Modulation $Q_m$ | TBS index $I_{TBS}$ |
|---|---|---|
| 0 (formerly 6) | 2 | 0 |
| 1 (formerly 7) | 2 | 1 |
| 2 (formerly 8) | 2 | 2 |
| 3 (formerly 9) | 2 | 3 |
| 4 (formerly 10) | 4 | 4 |
| 5 (formerly 11) | 4 | 5 |
| 6 (formerly 12) | 4 | 6 |
| 7 (formerly 13) | 4 | 7 |
| 8 (formerly 14) | 4 | 8 |
| 9 (formerly 15) | 4 | 9 |
| 10 (formerly 16) | 4 | 10 |
| 11 (formerly 17) | 6 | 11 |
| 12 (formerly 18) | 6 | 12 |
| 13 (formerly 19) | 6 | 13 |
| 14 (formerly 20) | 6 | 14 |
| 15 (formerly 21) | 6 | 15 |
| 16 (formerly 22) | 6 | 16 |
| 17 (formerly 23) | 6 | 17 |
| 18 (formerly 24) | 6 | 18 |
| 19 (formerly 25) | 6 | 19 |
| 20 (formerly 26) | 6 | 20 |
| 21 (formerly 27) | 6 | 21 |
| 22 (formerly 28) | 6 | 22 |
| 23 (new) | 8 | 23 |
| 24 (new) | 8 | 24 |
| 25 (new) | 8 | 25 |
| 26 (new) | 8 | 26 |
| 27 (new) | 8 | 27 |
| 28 (formerly 29) | 2 | reserved |
| 29 (formerly 30) | 4 | |
| 30 (formerly 31) | 6 | |
| 31 (new) | 8 | | mode B12: except first L2' combinations in even-numbered combinations of modulation and TBS index or odd-numbered combinations of modulation and TBS index, L1' combinations in the first modulation scheme and TBS index table in turn work as the first L1' combinations in the second modulation and TBS index table, and following L2'-1 combinations in the second modulation and TBS index table are combinations of M QAM and TBS index, the TBS indexes of the last L3' combinations in the second modulation and TBS index table are default; L1', L2' and L3' are positive integers greater than 1, and M is a number greater than 64; wherein, in the first modulation and TBS index table, the odd-numbered combinations of modulation and TBS index refer to a set of $1^{st}$, $3^{rd}$, $5^{th}$,..., $27^{th}$, $29^{th}$ combinations of modulation and TBS index, the even-numbered combinations of modulation and TBS index refer to a set of $2^{nd}$, $4^{th}$, $6^{th}$,..., $28^{th}$ combinations of modulation and TBS index;

According to the sub-mode B12, if L1'=23, L2'=6, L3'=4, and except the first L2' combinations in the even-numbered combinations of modulation and TBS index, the L1' combinations in the first modulation scheme and TBS index table in turn work as the first L1' combinations in the second modulation and TBS index table, then the second modulation and TBS index table can be designed as the following table 8:

TABLE 8

| MCS index $I_{MCS}$ | Modulation $Q_m$ | TBS index $I_{TBS}$ |
|---|---|---|
| 0 (formerly 0) | 2 | 0 |
| 1 (formerly 2) | 2 | 1 |
| 2 (formerly 4) | 2 | 2 |
| 3 (formerly 6) | 2 | 3 |
| 4 (formerly 8) | 2 | 4 |
| 5 (formerly 10) | 4 | 5 |
| 6 (formerly 12) | 4 | 6 |
| 7 (formerly 13) | 4 | 7 |
| 8 (formerly 14) | 4 | 8 |
| 9 (formerly 15) | 4 | 9 |
| 10 (formerly 16) | 4 | 10 |
| 11 (formerly 17) | 6 | 11 |
| 12 (formerly 18) | 6 | 12 |
| 13 (formerly 19) | 6 | 13 |
| 14 (formerly 20) | 6 | 14 |
| 15 (formerly 21) | 6 | 15 |
| 16 (formerly 22) | 6 | 16 |
| 17 (formerly 23) | 6 | 17 |
| 18 (formerly 24) | 6 | 18 |
| 19 (formerly 25) | 6 | 19 |
| 20 (formerly 26) | 6 | 20 |
| 21 (formerly 27) | 6 | 21 |
| 22 (formerly 28) | 6 | 22 |
| 23 (new) | 8 | 23 |
| 24 (new) | 8 | 24 |
| 25 (new) | 8 | 25 |
| 26 (new) | 8 | 26 |
| 27 (new) | 8 | 27 |
| 28 (formerly 29) | 2 | reserved |
| 29 (formerly 30) | 4 | |
| 30 (formerly 31) | 6 | |
| 31 (new) | 8 | |

Mode B13: except first L2'-2, one of $10^{th}$ and $11^{th}$, and one of $17^{th}$ and $18^{th}$, L1' combinations of modulation and TBS index in the first modulation and TBS index table in turn work as the first L1' combinations in the second modulation and TBS index table, next L2'-1 combinations following the first L1' combinations in the second modulation and TBS index table are combinations of M QAM and TBS index, and the TBS indexes of the last L3' combinations in the second modulation and TBS index table are default; L1', L2' and L3' are positive integers greater than 1, and M is a number greater than 64;

depending on the mode B13, if L1'=23, L2'=6, L3'=4, the second modulation and TBS index table may be designed as shown in Table 9:

TABLE 9

| MCS index $I_{MCS}$ | Modulation $Q_m$ | TBS index $I_{TBS}$ |
|---|---|---|
| 0 (formerly 4) | 2 | 0 |
| 1 (formerly 5) | 2 | 1 |

TABLE 9-continued

| MCS index $I_{MCS}$ | Modulation $Q_m$ | TBS index $I_{TBS}$ |
|---|---|---|
| 2 (formerly 6) | 2 | 2 |
| 3 (formerly 7) | 2 | 3 |
| 4 (formerly 8) | 2 | 4 |
| 5 (formerly 9) | 2 | 5 |
| 6 (formerly 11) | 4 | 6 |
| 7 (formerly 12) | 4 | 7 |
| 8 (formerly 13) | 4 | 8 |
| 9 (formerly 14) | 4 | 9 |
| 10 (formerly 15) | 4 | 10 |
| 11 (formerly 16) | 4 | 11 |
| 12 (formerly 18) | 6 | 12 |
| 13 (formerly 19) | 6 | 13 |
| 14 (formerly 20) | 6 | 14 |
| 15 (formerly 21) | 6 | 15 |
| 16 (formerly 22) | 6 | 16 |
| 17 (formerly 23) | 6 | 17 |
| 18 (formerly 24) | 6 | 18 |
| 19 (formerly 25) | 6 | 19 |
| 20 (formerly 26) | 6 | 20 |
| 21 (formerly 27) | 6 | 21 |
| 22 (formerly 28) | 6 | 22 |
| 23 (new) | 8 | 23 |
| 24 (new) | 8 | 24 |
| 25 (new) | 8 | 25 |
| 26 (new) | 8 | 26 |
| 27 (new) | 8 | 27 |
| 28 (formerly 29) | 2 | Reserved |
| 29 (formerly 30) | 4 | |
| 30 (formerly 31) | 6 | |
| 31 (new) | 8 | |

Mode B14: except first L2'-2, one of $10^{th}$ and $11^{th}$, and one of $17^{th}$ and $18^{th}$ in even-numbered combinations of modulation and TBS index or odd-numbered combinations of modulation and TBS index, L1' combinations of modulation and TBS index in the first modulation and TBS index table in turn work as the first L1' combinations in the second modulation and TBS index table, next L2'-1 combinations following the first L1' combinations in the second modulation and TBS index table are combinations of M QAM and TBS index, and the TBS indexes of the last L3' combinations in the second modulation and TBS index table are default; L1', L2' and L3' are positive integers greater than 1, and M is a number greater than 64;

depending on the mode B14, if L1'=23, L2'=6, L3'=4, the second modulation and TBS index table may be designed as shown in Table 10:

TABLE 10

| MCS index $I_{MCS}$ | Modulation $Q_m$ | TBS index $I_{TBS}$ |
|---|---|---|
| 0 (formerly 0) | 2 | 0 |
| 1 (formerly 2) | 2 | 1 |
| 2 (formerly 4) | 2 | 2 |
| 3 (formerly 6) | 2 | 3 |
| 4 (formerly 8) | 2 | 4 |
| 5 (formerly 9) | 2 | 5 |
| 6 (formerly 11) | 4 | 6 |
| 7 (formerly 12) | 4 | 7 |
| 8 (formerly 13) | 4 | 8 |
| 9 (formerly 14) | 4 | 9 |
| 10 (formerly 15) | 4 | 10 |
| 11 (formerly 16) | 4 | 11 |
| 12 (formerly 18) | 6 | 12 |
| 13 (formerly 19) | 6 | 13 |
| 14 (formerly 20) | 6 | 14 |
| 15 (formerly 21) | 6 | 15 |
| 16 (formerly 22) | 6 | 16 |
| 17 (formerly 23) | 6 | 17 |

TABLE 10-continued

| MCS index $I_{MCS}$ | Modulation $Q_m$ | TBS index $I_{TBS}$ |
|---|---|---|
| 18 (formerly 24) | 6 | 18 |
| 19 (formerly 25) | 6 | 19 |
| 20 (formerly 26) | 6 | 20 |
| 21 (formerly 27) | 6 | 21 |
| 22 (formerly 28) | 6 | 22 |
| 23 (new) | 8 | 23 |
| 24 (new) | 8 | 24 |
| 25 (new) | 8 | 25 |
| 26 (new) | 8 | 26 |
| 27 (new) | 8 | 27 |
| 28 (formerly 29) | 2 | reserved |
| 29 (formerly 30) | 4 | |
| 30 (formerly 31) | 6 | |
| 31 (new) | 8 | |

Or, mode B2: the second modulation and TBS index table has 32 or 64 values, any combination of modulation scheme and TBS index in the second modulation and TBS index table is different from all combinations of modulation and TBS index in the first modulation and TBS index table; or, the first combination of modulation scheme and TBS index in the second modulation and TBS index table is the same as the k-th combination in the first modulation and TBS index table, and the TBS indexes of the last four combinations in the second modulation and TBS index table are default, and others are different, k is a positive integer between 1-5. Wherein the first combination of modulation scheme and TBS index in the second modulation and TBS index table is the first row in the second modulation and TBS index table, and the corresponding MCS index is 0.

According to the mode B2, if the second modulation and TBS index table has 32 values, any combination of modulation scheme and TBS index in the second modulation and TBS index table is different from all combinations of modulation and TBS index in the first modulation and TBS index table, and the second modulation and TBS index table may be designed as shown in Table 11:

TABLE 11

| MCS index $I_{MCS}$ | Modulation $Q_m$ | TBS index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 4 | 5 |
| 7 | 4 | 6 |
| 8 | 4 | 7 |
| 9 | 4 | 8 |
| 10 | 4 | 9 |
| 11 | 4 | 10 |
| 12 | 4 | 11 |
| 13 | 6 | 11 |
| 14 | 6 | 12 |
| 15 | 6 | 13 |
| 16 | 6 | 14 |
| 17 | 6 | 15 |
| 18 | 6 | 16 |
| 19 | 6 | 17 |
| 20 | 6 | 18 |
| 21 | 6 | 19 |
| 22 | 8 | 19 |
| 23 | 8 | 20 |
| 24 | 8 | 21 |
| 25 | 8 | 22 |
| 26 | 8 | 23 |

TABLE 11-continued

| MCS index $I_{MCS}$ | Modulation $Q_m$ | TBS index $I_{TBS}$ |
|---|---|---|
| 27 | 8 | 24 |
| 28 | 2 | Reserved |
| 29 | 4 | |
| 30 | 6 | |
| 31 | 8 | |

Or, mode B3: the second modulation and TBS index table has 64 values, the first l odd-numbered or even-numbered combinations of modulation and TBS index in the second modulation and TBS index table are the combinations of modulation and TBS index in the first modulation and TBS index table, where l is a positive integer between 20-29.

According to the sub-mode B3, if l=26, and the first l even-numbered combinations of modulation and TBS index in the second modulation scheme and TBS index table are the combinations of modulation and TBS index in the first modulation and TBS index table, and the second modulation and TBS index table may be designed as shown in Table 12:

TABLE 12

| MCS index $I_{MCS}$ | Modulation order $Q_m$ | TBS index $I_{TBS}$ |
|---|---|---|
| 0 (new) | 2 | 0 |
| 1 (formerly 0) | 2 | 1 |
| 2 (formerly 1) | 2 | 2 |
| 3 (formerly 2) | 2 | 3 |
| 4 (new) | 2 | 4 |
| 5 (formerly 3) | 2 | 5 |
| 6 (new) | 2 | 6 |
| 7 (formerly 4) | 2 | 7 |
| 8 (new) | 2 | 8 |
| 9 (formerly 5) | 2 | 9 |
| 10 (new) | 2 | 10 |
| 11 (formerly 6) | 2 | 11 |
| 12 (new) | 2 | 12 |
| 13 (formerly 7) | 2 | 13 |
| 14 (new) | 2 | 14 |
| 15 (formerly 8) | 2 | 15 |
| 16 (new) | 2 | 16 |
| 17 (formerly 10) | 4 | 17 |
| 18 (new) | 4 | 18 |
| 19 (formerly 11) | 4 | 19 |
| 20 (new) | 4 | 20 |
| 21 (formerly 12) | 4 | 21 |
| 22 (new) | 4 | 22 |
| 23 (formerly 13) | 4 | 23 |
| 24 (new) | 4 | 24 |
| 25 (formerly 14) | 4 | 25 |
| 26 (new) | 4 | 26 |
| 27 (formerly 15) | 4 | 27 |
| 28 (new) | 4 | 28 |
| 29 (formerly 17) | 6 | 29 |
| 30 (new) | 6 | 30 |
| 31 (formerly 18) | 6 | 31 |
| 32 (new) | 6 | 32 |
| 33 (formerly 19) | 6 | 33 |
| 34 (new) | 6 | 34 |
| 35 (formerly 20) | 6 | 35 |
| 36 (new) | 6 | 36 |
| 37 (formerly 21) | 6 | 37 |
| 38 (new) | 6 | 38 |
| 39 (formerly 22) | 6 | 39 |
| 40 (new) | 6 | 40 |
| 41 (formerly 23) | 6 | 41 |
| 42 (new) | 6 | 42 |
| 43 (formerly 24) | 6 | 43 |
| 44 (new) | 6 | 44 |
| 45 (formerly 25) | 6 | 45 |
| 46 (new) | 6 | 46 |
| 47 (formerly 26) | 6 | 47 |

TABLE 12-continued

| MCS index $I_{MCS}$ | Modulation order $Q_m$ | TBS index $I_{TBS}$ |
|---|---|---|
| 48 (new) | 6 | 48 |
| 49 (formerly 27) | 6 | 49 |
| 50 (new) | 6 | 50 |
| 51 (formerly 28) | 6 | 51 |
| 52 (new) | 8 | 52 |
| 53 (new) | 8 | 53 |
| 54 (new) | 8 | 54 |
| 55 (new) | 8 | 55 |
| 56 (new) | 8 | 56 |
| 57 (new) | 8 | 57 |
| 58 (new) | 8 | 58 |
| 59 (new) | 8 | 59 |
| 60 (formerly 29) | 2 | Reserved |
| 61 (formerly 30) | 4 | |
| 62 (formerly 31) | 6 | |
| 63 (new) | 8 | |

Based on the above-mentioned embodiment, the modulation processing method, which is applied to the eNodeB, of the present document is shown in FIG. 1, and comprises the following steps:

in step 101: the eNodeB transmits a high-layer configuration signaling to the UE, wherein the high-layer configuration signaling is used to indicate whether to support a high-order QAM modulation scheme, the high-order QAM modulation scheme is a modulation scheme with a higher-order the 64QAM.

In step 102: the eNodeB receives channel state information of the UE, and the channel state information at least comprises the channel quality indication (CQI) information, when the high-layer configuration signaling indicates not supporting the high-order QAM modulation scheme, the CQI information is obtained based on the first CQI table which does not support the high-order QAM modulation scheme, when the high-layer configuration signaling indicates supporting the high-order QAM modulation scheme, the CQI information is obtained based on the second CQI table which supports the high-order QAM modulation scheme.

In step 103: the eNodeB transmits a downlink control signaling to the UE, and the downlink control signaling at least comprises a modulation and coding scheme field ($I_{MCS}$), when the high-layer configuration signaling indicates not supporting the high-order QAM modulation scheme, then the modulation and coding scheme field ($I_{MCS}$) is determined based on the first modulation and transport block size (TBS) index table which does not support the high-order QAM modulation scheme; when the high-layer configuration signaling indicates supporting the high-order QAM modulation scheme, the modulation and coding scheme field ($I_{MCS}$) is determined based on the second modulation and TBS index table which supports the high-order QAM modulation scheme.

Thereafter, the eNodeB transmits the downlink data to the UE based on the above-mentioned downlink control signaling.

Furthermore, the present document further provides a coding and modulation processing method, and the method is based on the UE, that is, the method of the present document is described from the view of the UE, and the method comprises that:

the UE receives a high-layer configuration signaling transmitted by the eNodeB, and the high-layer configuration signaling is used to indicate whether to support a high-order QAM modulation scheme, the high-order QAM modulation scheme is a modulation scheme of M QAM, wherein M is a number greater than 64.

Alternatively, the high-layer configuration signaling is new.

Alternatively, it is to predefine one or more transmission modes to support transmitting the high-layer configuration signaling, and other modes do not support transmitting the high-layer configuration signaling, the eNodeB only transmit the high-layer configuration signaling when the transmission mode supports transmitting the high-layer configuration signaling.

Alternatively, it is to predefine one or more transmission modes to support the high-order QAM modulation scheme, and other modes do not support the high-order QAM modulation scheme, the high-layer configuration signaling is a transmission mode indication signaling.

Alternatively, after the UE receives the high-layer configuration signaling, the method further comprises that:

on the basis of any of the above-mentioned high-layer configuration signaling implementations, the UE transmits the channel state information to the eNodeB, wherein the channel state information at least comprises channel quality indication (CQI) information, when the high-layer configuration signaling indicates not supporting the high-order QAM modulation scheme, the CQI information is obtained based on the first CQI table which does not support the high-order QAM modulation scheme, when the high-layer configuration signaling indicates supporting the high-order QAM modulation scheme, the CQI information is obtained based on the second CQI table which supports the high-order QAM modulation scheme.

Alternatively, the corresponding code rate value r is a real number between 0.92 and 0.96 when the modulation scheme of the last combination in the second CQI table is a QAM with a order-higher than 64.

Alternatively, the first CQI table is the 4-bit CQI table in the LTE Release 8; the second CQI table is formed with the following modes:

mode A1:

The second CQI table has 16 values, that is, the CQI is represented by 4 bits, except L2 combinations of modulation scheme and code rate, L1 combinations of modulation scheme and code rate in the first CQI table work as the first L1 combinations of modulation scheme and code rate in the second CQI table, and the next L2 combinations of modulation scheme and code rate in the second CQI table are combinations of M QAM and code rate; L1 and L2 is positive integers greater than 1, and L1+L2=15, wherein M is a number greater than 64;

or, mode A2: in the second CQI table, the CQI has 16 or 32 values, any combination of modulation scheme and code rate in the second CQI table is different from all combinations of modulation scheme and code rate in the first CQI table; alternatively, the first combination of modulation scheme and code rate in the second CQI table is the same as the k-th combination of modulation scheme and code rate in the first CQI table, other combinations of modulation scheme and code rate in the second CQI table are different from all combinations of modulation scheme and code rate in the first CQI table, k is a positive integer between 1 and 5; wherein, in the second CQI table, the first combination of modulation scheme and code rate refers to the second row in the second CQI table, and the corresponding CQI index is 1.

Or, mode A3: the CQI in the second CQI table has 32 values, the first 13, 14 or 15 combinations in the odd-numbered combinations of modulation scheme and code rate in the second CQI table are combinations of modulation scheme and code rate in the first CQI table. Wherein, in the second CQI table, the odd-numbered combinations of modulation scheme and code rate refer to the set of the 1st, 3rd, 5th, 7th, 9th, 11th, 13th, 15th combinations of modulation scheme and code rate.

Alternatively, the mode A1 can be mode A11 or mode A12, wherein:

mode A11: except first L2' combinations of modulation scheme and code rate, L1' combinations of modulation scheme and code rate in the first CQI table in turn work as the first L1' combinations of modulation scheme and code rate in the second CQI table, and next L2' combinations of modulation scheme and code rate in the second CQI table are combinations of M QAM and code rate;

mode A12: except the L2' combinations in the even-numbered or odd-numbered combinations of modulation and code rate, L1' combinations in the first CQI table in turn work as the first L1' combinations in the second CQI table, the last L2' combinations of modulation scheme and code rate in the second CQI table are combinations of M QAM and code rate; wherein, in the first CQI table, the even-numbered combinations of modulation scheme and code rate refer to the set of the $2^{nd}$, $4^{th}$, $6^{th}$, $8^{th}$, $10^{th}$, $12^{th}$, $14^{th}$ combinations of modulation scheme and code rate, wherein, M is a number greater than 64, L1' and L2' are positive integers greater than 1.

Alternatively, on the basis of any of the abovementioned high-layer configuration signaling implementations, the UE receives a downlink control signaling sent by the eNodeB, and the downlink control signaling at least comprises a modulation and coding scheme field ($I_{MCS}$), and when the high-layer configuration signaling indicates not supporting the high-order QAM modulation scheme, the modulation and coding scheme field ($I_{MCS}$) is determined based on the first modulation and transport block size (TBS) index table which does not support the high-order QAM modulation scheme; when the high-layer configuration signaling indicates supporting the high-order QAM modulation scheme, the modulation and coding scheme field ($I_{MCS}$) is determined based on the second modulation and TBS index table which supports the high-order QAM modulation scheme.

Alternatively, the first modulation and TBS index table is the 5-bit modulation and TBS index table in the LTE Release 8; the second modulation and TBS index table is formed with one of the following modes:

mode B1: the second modulation and TBS index table has 32 values, that is, the MCS index is represented by 5 bits, except L2 combinations of modulation and TBS index, L1 combinations in the first modulation and TBS index table in turn work as the first L1 combinations in the second modulation scheme and TBS index table, the next L2-1 combinations following the first L1 combinations in the second modulation and TBS index table are combinations of M QAM and TBS index, the TBS indexes of the last L3 combinations in the second modulation and TBS index table are default; L1, L2 and L3 are positive integers greater than 1, and L1+L2+L3−1=32, wherein M is a number greater than 64;

Or, mode B2: the second modulation and TBS index table has 32 or 64 values, any combination of modulation scheme and TBS index in the second modulation and TBS index table is different from all combinations of modulation and TBS index in the first modulation and TBS index table; or, the first combination of modulation scheme and TBS index in the second modulation and TBS index table is the same as the k-th combination in the first modulation and TBS index table, and the TBS indexes of the last four combinations in the second modulation and TBS index table are default, and others are different, k is a positive integer between 1-5; wherein the first combination of modulation scheme and TBS index in the second modulation and TBS index table is the first row in the second modulation and TBS index table, and the corresponding MCS index is 0.

Or, mode B3: the second modulation and TBS index table has 64 values, the first l odd-numbered or even-numbered combinations of modulation and TBS index in the second modulation and TBS index table are combinations of modulation and TBS index in the first modulation and TBS index table, where l is a positive integer between 20-29.

Alternatively, the mode B1 may be the mode B11, mode B12, mode B13 or mode B14, wherein:

mode B11: except first L2' combinations of modulation and TBS index, L1' combinations in the first modulation and TBS index table in turn work as the first L1' combinations in the second modulation scheme and TBS index table, next L2'-1 combinations in the second modulation and TBS index table are combinations of M QAM and TBS index, the TBS indexes of the last L3' combinations in the second modulation and TBS index table are default; L1', L2', and L3' are positive integers greater than 1, and M is a number greater than 64;

mode B12: except first L2' combinations in even-numbered combinations of modulation and TBS index or odd-numbered combinations of modulation and TBS index, L1' combinations in the first modulation scheme and TBS index table in turn work as the first L1' combinations in the second modulation and TBS index table, and next L2'-1 combinations in the second modulation and TBS index table are combinations of M QAM and TBS index, the TBS indexes of the last L3' combinations in the second modulation and TBS index table are default; L1', L2' and L3' are positive integers greater than 1, and M is a number greater than 64; wherein, in the first modulation and TBS index table, the odd-numbered combinations of modulation and TBS index refer to a set of $1^{st}$, $3^{rd}$, $5^{th}$, . . . ,$27^{th}$, $29^{th}$ combinations of modulation and TBS index, the even-numbered combinations of modulation and TBS index refer to a set of $2^{nd}$, $4^{th}$, $6^{th}$, . . . , $28^{th}$ combinations of modulation and TBS index;

mode B13: except first L2'-2 combinations, one of $10^{th}$ and $11^{th}$ combinations, and one of $17^{th}$ and $18^{th}$ combinations, L1' combinations of modulation and TBS index in the first modulation and TBS index table in turn work as the first L1' combinations in the second modulation and TBS index table, next L2'-1 combinations following the first L1' combinations in the second modulation and TBS index table are combinations of M QAM and TBS index, and the TBS indexes of the last L3' combinations in the second modulation and TBS index table are default; L1', L2' and L3' are positive integers greater than 1, and M is a number greater than 64;

mode B14: except first L2'-2 combinations, one of $10^{th}$ and $11^{th}$ combinations, and one of $17^{th}$ and $18^{th}$ combinations in even-numbered combinations of modulation and TBS index or odd-numbered combinations of modulation and TBS index, L1' combinations of modulation and TBS index in the first modulation and TBS index table in turn work as the first L1' combinations in the second modulation and TBS index table, next L2'-1 combinations following the first L1' combinations in the second modulation and TBS index table are combinations of M QAM and TBS index, and the TBS indexes of the last L3' combinations in the second modulation and TBS index table are default; L1', L2' and L3' are positive integers greater than 1, and M is a number greater than 64.

Figure 2:
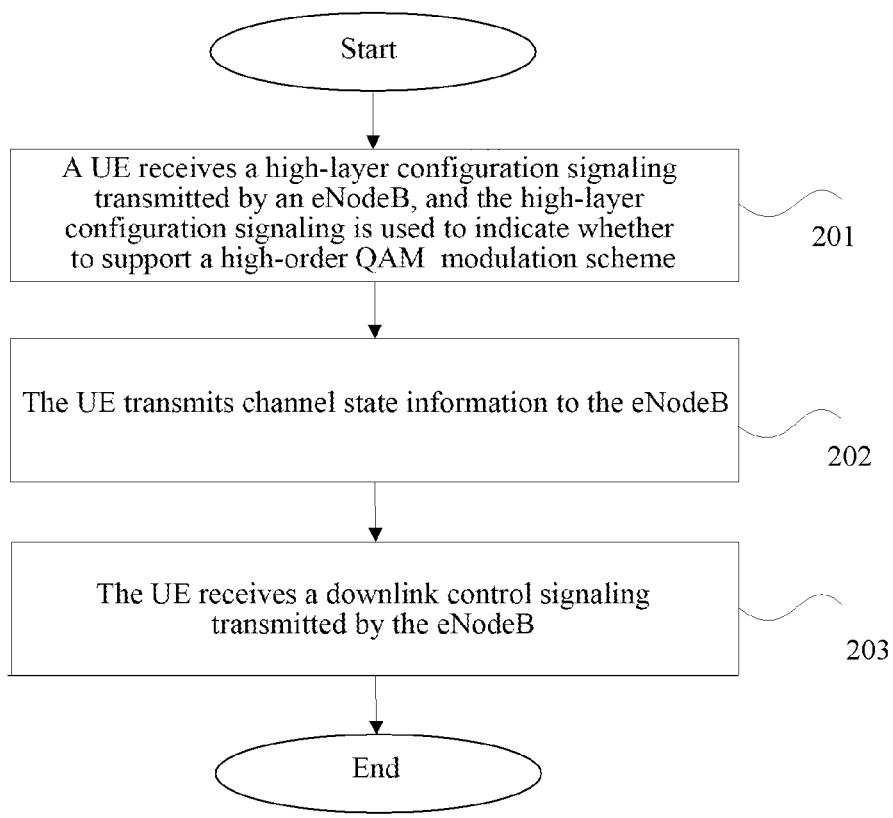
FIG. 2 is a schematic diagram of a modulation processing method applied to a UE in accordance with an embodiment of the present document.
Figure 3:
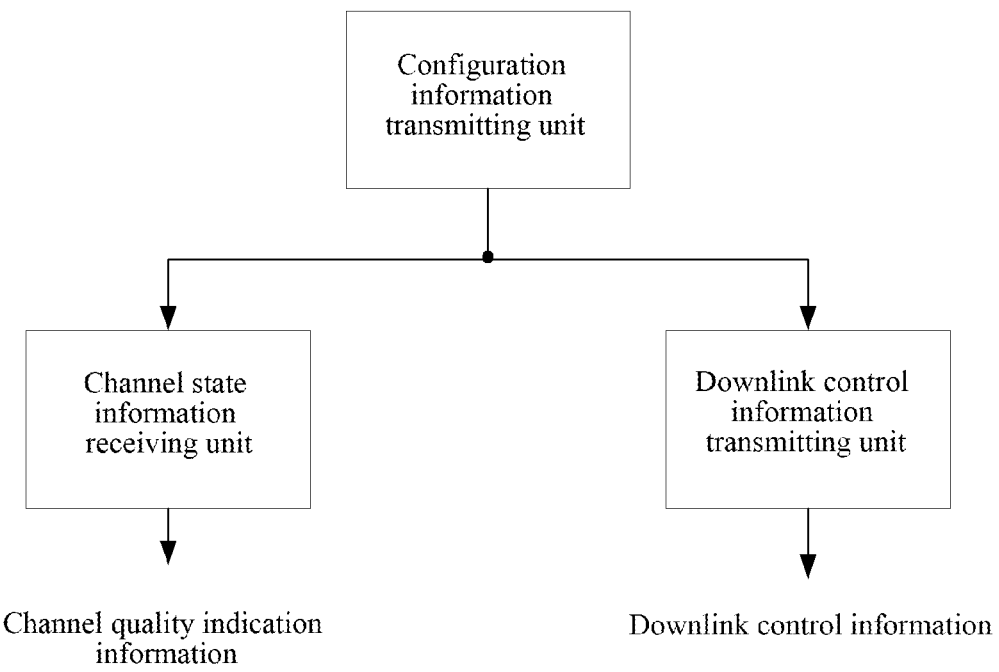
FIG. 3 is a schematic diagram of structure of the base station in accordance with an embodiment of the present document.

Based on the above description, a coding and modulation processing method applied to the UE, as shown in FIG. 2, comprises that:

in step 201: the UE receives a high-layer configuration signaling transmitted by the eNodeB, wherein the high-layer configuration signaling is used to indicate whether to support a high-order QAM modulation scheme, the high-order QAM modulation scheme e is a modulation scheme of M QAM, wherein M is a number greater than 64;

in step 202: the UE transmits the channel state information to the eNodeB, wherein the channel state information at least comprises channel quality indication (CQI) information, when the high-layer configuration signaling indicates not supporting the high-order QAM modulation scheme, the CQI information is obtained based on the first CQI table which does not support the high-order QAM modulation scheme, when the high-layer configuration signaling indicates supporting the high-order QAM modulation scheme, the CQI information is obtained based on a second CQI table which supports the high-order QAM modulation scheme;

in step 203: the UE receives a downlink control signaling transmitted by the eNodeB, and the downlink control signaling at least comprises a modulation and coding scheme field ($I_{MCS}$), when the high-layer configuration signaling indicates not supporting the high-order QAM modulation scheme, then the modulation and coding scheme field ($I_{MCS}$) is determined based on the first modulation and transport block size (TBS) index table which does not support the high-order QAM modulation scheme; when the high-layer configuration signaling indicates supporting the high-order QAM modulation scheme, the field of modulation and coding scheme ($I_{MCS}$) is determined based on the second modulation and TBS index table which supports the high-order QAM modulation scheme.

Corresponding to the above-mentioned method embodiment, the present document further provides the embodiment of a base station, and the base station comprises that:

a configuration signaling transmitting unit is configured to transmit a high-layer configuration signaling to a UE, wherein the high-layer configuration signaling is used to indicate whether to support the high-order QAM modulation scheme, and the high-order QAM modulation scheme is a modulation scheme of M QAM, wherein M is a number greater than 64.

The specific implementation of the high-layer configuration signaling is described as above.

Alternatively, the base station further comprises a channel state information receiving unit, which is configured to receive channel state information of the base station, and the channel state information at least comprises channel quality indication (CQI) information, when the high-layer configuration signaling indicates not supporting the high-order QAM modulation scheme, the CQI information is obtained based on the first CQI table which does not support the high-order QAM modulation scheme, when the high-layer configuration signaling indicates not supporting the high-order QAM modulation scheme, the CQI information is obtained based on the second CQI table which supports the high-order QAM modulation scheme.

The specific implementations of the first and second CQI tables are described as above.

Alternatively, the base station further comprises a downlink control signaling transmitting unit, which is configured to transmit a downlink control signaling to the UE, the downlink control signaling at least comprises a modulation and coding scheme field ($I_{MCS}$), when the high-layer configuration signaling indicates not supporting the high-order QAM modulation scheme, the modulation and coding scheme field ($I_{MCS}$) is determined based on the first modulation and transport block size (TBS) index table which does not support the high-order QAM modulation scheme; when the high-layer configuration signaling indicates supporting the high-order QAM modulation scheme, the modulation and coding scheme field ($I_{MCS}$) is determined based on the second modulation and TBS index table which supports the high-order QAM modulation scheme.

The specific implementations of the first and second modulation and TBS index tables are described as above.

In short, the base station in the embodiment of the present document can be used to support the MQAM transmission and feedback very well, and it supports the MQAM under the conditions of being compatible with existing systems, without increasing signaling overheads, and ensuring the transmission and feedback consistent, and increases the system frequency efficiency and the data peak rate, and supports or does not support using the 256QAM through the semi-static switching, thus ensuring the use of 256QAM in reasonable environments, for example, the 256QAM can only be used in the small-cell environment.

UE Embodiment

Figure 4:
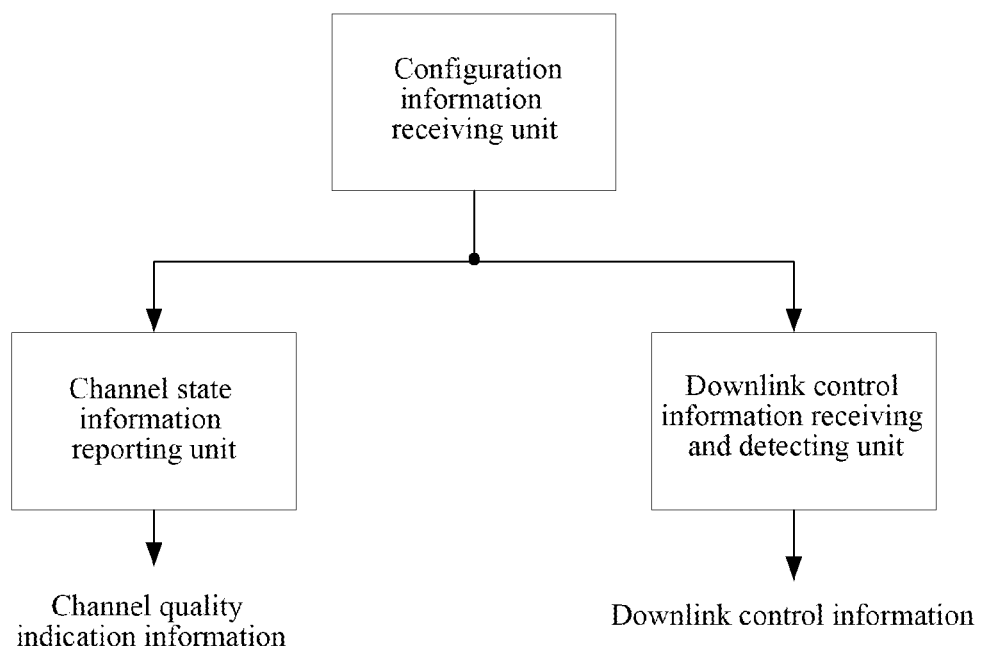
FIG. 4 is a structure diagram of structure of the UE in accordance with an embodiment of the present document.

Corresponding to the above-mentioned method embodiment, the present document further provides a UE embodiment, and as shown in FIG. 4, the UE comprises that:

a configuration information receiving unit, is configured to received a high-layer configuration signaling transmitted by a base station, wherein the high-layer configuration signaling is used to indicate whether to support the high-order QAM modulation scheme, and the high-order QAM modulation scheme is a modulation scheme of M QAM, wherein M is a number greater than 64.

The description of the high-layer configuration signaling is as above.

a channel state information reporting unit, is configured to transmit channel state information to the base station, and the channel state information at least comprises channel quality indication (CQI) information, when the high-layer configuration signaling indicates not supporting the high-order QAM modulation scheme, the CQI information is obtained based on the first CQI table which does not support the high-order QAM modulation scheme, when the high-layer configuration signaling indicates not supporting the high-order QAM modulation scheme, the CQI information is obtained based on the second CQI table which supports the high-order QAM modulation scheme.

The descriptions of the first and second CQI tables are as above.

a control information receiving and detecting unit, is configured to receive and detect the downlink control signaling transmitted by the base station, wherein the downlink control signaling at least comprises a modulation and coding scheme field ($I_{MCS}$), when the high-layer configuration signaling indicates not supporting the high-order QAM modulation scheme, the modulation and coding scheme field ($I_{MCS}$) is determined based on the first modulation and transport block size (TBS) index table which does not support the high-order QAM modulation scheme; when the high-layer configuration signaling indicates supporting the high-order QAM modulation scheme, the modulation and coding scheme field is determined based on the second modulation and TBS index table which supports the high-order QAM modulation scheme.

The descriptions of the first and second modulation and TBS index tables are as above.

In short, The UE of the embodiment of the present document can be used to support the MQAM transmission and feedback very well, and support the MQAM under the conditions of being compatible with existing systems, without increasing signaling overheads and ensuring the transmission and feedback consistent, increase the system frequency efficiency and the data peak rate, and support or not support using the 256QAM through the semi-static switching, thus ensuring the use of 256QAM in reasonable environments, for example, the 256QAM can only be used in the small-cell environment.

The modulation processing method, the base station and the UE in the embodiment of the present document ensure the consistency of feedback and transmission through the high-layer configuration signaling which indicates whether to support the high-order QAM modulation scheme, on one hand, it supports the high-order QAM modulation scheme on the basis of being compatible with existing wireless transmission networks, thereby increasing the data peak rate and the spectral efficiency, and on the other hand, it achieves the switching support of whether to use the high-order QAM modulation scheme, and supports the high-order QAM transmission under the condition of being suitable for the high-order QAM modulation scheme (such as small-cell, low interference), and does not support the high-order QAM transmission under the condition of being not suitable for the high-order QAM modulation scheme (such as macro base station).

Those ordinarily skilled in the art can understand that all or some steps of the abovementioned method may be completed by the programs instructing the relevant hardware, and the abovementioned programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

The above description is only embodiments of the present document, and is not used to limit the present document, for those skilled in the art, the present document can have various modifications and changes. Any modifications, equivalent replacements and improvements made within the spirit and principle of the present document should be included in the claims of the present document.

INDUSTRIAL APPLICABILITY

Through the high-layer configuration signaling which indicates whether to support the high-order QAM modulation scheme, the embodiment of the present document supports the high-order QAM modulation on the basis of being compatible with existing wireless transmission networks, thereby increasing the data peak rate and the spectral efficiency.

What is claimed is:

1. A coding and modulation processing method, wherein, the method comprises:
a base station transmitting a high-layer configuration signaling to a user equipment (UE), wherein the high-layer configuration signaling is used to indicate whether to support a high-order Quadrature Amplitude Modulation (QAM) modulation scheme, and the high-order QAM modulation scheme is a modulation scheme of M QAM, wherein M is a number greater than 64;
wherein, after the base station transmits the high-layer configuration signaling, the method further comprises:
the base station receiving channel state information of the UE, wherein the channel state information at least comprises channel quality indication (CQI) information, and when the high-layer configuration signaling indicates not supporting the high-order QAM modulation scheme, the CQI information is obtained based on a first CQI table which does not support the high-order QAM modulation scheme, and when the high-layer configuration signaling indicates supporting the high-order QAM modulation scheme, the CQI information is obtained based on a second CQI table which supports the high-order QAM modulation scheme.

2. The method of claim 1, wherein, the high-layer configuration signaling is newly added.

3. The method of claim 1, wherein: a code rate value r corresponding to a last combination of modulation and code rate in the second CQI table is a real number between 0.92 and 0.96.

4. The method of claim 1, wherein: the first CQI table is a 4-bit CQI table in Long Term Evolution (LTE) Release 8; the second CQI table is formed with one of the following modes:
mode A1:
the CQI in the second CQI table has 16 values, that is, the CQI is represented by 4 bits, except L2 combinations of modulation scheme and code rate, L1 combinations of modulation scheme and code rate in the first CQI table in turn work as first L1 combinations of modulation and code rate in the second CQI table, and next L2 combinations of modulation scheme and code rate in the second CQI table are combinations of M QAM and code rate; L1 and L2 are positive integers greater than 1, and L1+L2=15, and M is a number greater than 64;
or, mode A2: the CQI in the second CQI table has 16 or 32 values, any combination of modulation scheme and code rate in the second CQI table is different from all combinations of modulation scheme and code rate in the first CQI table; alternatively, a first combination of modulation scheme and code rate in the second CQI table is same as a k-th combination of modulation scheme and code rate in the first CQI table, and other combinations of modulation scheme and code rate in the second CQI table are different from all combinations of modulation scheme and code rate in the first CQI table, k is a positive integer between 1 and 5;
or, mode A3: the CQI in the second CQI table has 32 values, first 13, 14 or 15 combinations in odd-numbered combinations of modulation scheme and code rate in the second CQI table are combinations of modulation scheme and code rate in the first CQI table.

5. The method of claim 1, wherein, the mode A1 comprises a mode A11 or a mode A12, wherein:
the mode A11 comprises that: except first L2' combinations of modulation scheme and code rate, L1' combinations of modulation scheme and code rate in the first CQI table in turn work as the first L1' combinations of modulation scheme and code rate in the second CQI table, and next L2' combinations of modulation scheme and code rate in the second CQI table are combinations of M QAM and code rate;

the mode A12 comprises that: except first L2' even-numbered combinations of modulation and code rate or odd-numbered combinations of modulation and code rate, L1' combinations in the first CQI table in turn work as the first L1' combinations in the second CQI table, last L2' combinations of modulation scheme and code rate in the second CQI table are combinations of M QAM and code rate; wherein, in the first CQI table, the odd-numbered combinations of modulation scheme and code rate refer to a set of $1^{st}$, $3^{rd}$, $5^{th}$, $7^{th}$, $9^{th}$, $11^{th}$ and $13^{th}$ combinations of modulation scheme and code rate, the even-numbered combinations of modulation scheme and code rate refer to a set of $2^{nd}$, $4^{th}$, $6^{th}$, $6^{th}$, $10^{th}$, $12^{th}$, $14^{th}$ combinations of modulation scheme and code rate, wherein, M is a number greater than 64, L1' and L2' are positive integers greater than 1.

6. The method of claim 1, wherein, after the base station transmits the high-layer configuration signaling, the method further comprises:

the base station transmitting a downlink control signaling to the UE, wherein the downlink control signaling at least comprises a modulation and coding scheme field ($I_{MCS}$), when the high-layer configuration signaling indicates not supporting the high-order QAM modulation scheme, then the modulation and coding scheme field ($I_{MCS}$) being determined based on a first modulation and transport block size (TBS) index table which does not support the high-order QAM modulation scheme; when the high-layer configuration signaling indicates supporting the high-order QAM modulation scheme, in combination with predefined information, determining whether the modulation and coding scheme field ($I_{MCS}$) is determined based on a second modulation and TBS index table which supports the high-order QAM.

7. The method of claim 6, wherein: the predefined information is at least one of the following: a search space, a downlink control information format, a Cyclic Redundancy Check (CRC) scrambling mode corresponding to the downlink control information.

8. The method of claim 6, wherein:

the predefined information is the search space, and predefines that: when the high-layer configuration signaling indicates supporting the high-order QAM modulation scheme and it is in a public search space, the modulation and coding scheme field ($I_{MCS}$) is determined based on the first modulation and transport block size (TBS) index table which does not support the high-order QAM modulation scheme; when the high-layer configuration signaling indicates supporting the high-order QAM modulation scheme and it is in a UE-specific search space, the modulation and coding scheme field ($I_{MCS}$) is determined based on the second modulation and transport block size (TBS) index table which supports the high-order QAM modulation scheme;

or, the pre-defined information is the search space and the CRC scrambling mode corresponding to the downlink control information, and predefines that: when the high-order configuration signaling indicates supporting the high-order QAM modulation scheme and a Semi-Persistent Scheduling (SPS) Cell Radio Network Temporary Identifier (C-RNTI) scrambles CRC in the public search space or in the UE-specific search space, the modulation and coding scheme field ($I_{MCS}$) is determined based on the first modulation and transport block size (TBS) index table which does not support the high-order QAM modulation scheme; when the high-layer configuration signaling indicates supporting the high-order QAM modulation scheme and the C-RNTI scrambles the CRC in the UE-specific search space, the modulation and coding scheme field) is determined based on the second modulation and transport block size (TBS) index table which supports the high-order QAM modulation scheme.

9. The method of claim 6, wherein, the predefined information is the downlink control information format and predefines that: when the high-layer configuration signaling indicates supporting the high-order QAM modulation scheme and the downlink control information format is a format which is predefined as supporting the high-order QAM modulation scheme, then the modulation and coding scheme field ($I_{MCS}$) is determined based on the second modulation and transport block size (TBS) index table which supports the high-order QAM modulation scheme, when the high-layer configuration signaling indicates not supporting the high-order QAM modulation scheme or the downlink control information format is a format which is predefined as not supporting the high-order QAM modulation scheme, the modulation and coding scheme field ($I_{MCS}$) is determined based on the first modulation and transport block size (TBS) index table which does not support the high-order QAM modulation scheme.

10. The method of claim 6, wherein: the first modulation and TBS index table is a 5-bit modulation and TBS index table in LTE Release 8; the second modulation and TBS index table is formed with one of the following modes:

mode B1: there are 32 values in the second modulation and TBS index table, that is, a modulation and coding scheme (MCS) index is represented by 5 bits, except L2 combinations of modulation scheme and TBS index, L1 combinations in the first modulation and TBS index table in turn work as first L1 combinations in the second modulation scheme and TBS index table, next L2-1 combinations just following the first L1 combinations in the second modulation and TBS index table are combinations of M QAM and TBS index, TBS indexes of last L3 combinations in the second modulation and TBS index table are default; L1, L2 and L3 are positive integers greater than 1, and L1+L2+L3−1=32, and M is a number greater than 64;

or, mode B2: there are 32 or 64 values in the second modulation and TBS index table, any combination of modulation scheme and TBS index in the second modulation and TBS index table is different from all combinations of modulation and TBS index in the first modulation and TBS index table; or, a first combination of modulation scheme and TBS index in the second modulation and TBS index table is same as a k-th combination in the first modulation and TBS index table, and TBS indexes of last four combinations in the second modulation and TBS index table are default, and others are different, k is a positive integer between 1 and 5;

or, mode B3: there are 64 values in the second modulation and TBS index table, first l odd-numbered or even-numbered combinations of modulation and TBS index in the second modulation and TBS index table are combinations of modulation and TBS index in the first modulation and TBS index table, where l is a positive integer between 20 and 29.

11. The method of claim 10, wherein: the mode B1 comprises a mode B11, a mode B12, a mode B13 or a mode B14, wherein:

the mode B11 comprises that: except first L2' combinations of modulation and TBS index, L1' combinations in the first modulation and TBS index table in turn work as the first L1' combinations in the second modulation scheme and TBS index table, next L2'-1 combinations in the second modulation and TBS index table are combinations of M QAM and TBS index, the TBS indexes of the last L3' combinations in the second modulation and TBS index table are default; L1', L2' and L3' are positive integers greater than 1, and M is a number greater than 64;

the mode B12 comprises that: except first L2'combinations in even-numbered combinations of modulation and TBS index or odd-numbered combinations of modulation and TBS index, L1' combinations in the first modulation scheme and TBS index table in turn work as the first L1' combinations in the second modulation and TBS index table, and next L2'-1 combinations in the second modulation and TBS index table are combinations of M QAM and TBS index, the TBS indexes of the last L3' combinations in the second modulation and TBS index table are default; L1', L2' and L3' are positive integers greater than 1, and M is a number greater than 64; wherein, in the first modulation and TBS index table, the odd-numbered combinations of modulation and TBS index refer to a set of $1^{st}$, $3^{rd}$, $5^{th}$, ..., $27^{th}$, $29^{th}$ combinations of modulation and TBS index, the even-numbered combinations of modulation and TBS index refer to a set of $2^{nd}$, $4^{th}$, $6^{th}$, ..., $28^{th}$ combinations of modulation and TBS index;

the mode B13 comprises that: except first L2'-2 combinations, one of $10^{th}$ and $11^{th}$ combinations, and one of $17^{th}$ and $18^{th}$ combinations, L1' combinations of modulation and TBS index in the first modulation and TBS index table in turn work as the first L1' combinations in the second modulation and TBS index table, next L2'-1 combinations following the first L1' combinations in the second modulation and TBS index table are combinations of M QAM and TBS index, and the TBS indexes of the last L3' combinations in the second modulation and TBS index table are default; L1', L2' and L3' are positive integers greater than 1, and M is a number greater than 64;

the mode B14 comprises that: except first L2'-2 combinations, one of $10^{th}$ and $11^{th}$ combinations, and one of $17^{th}$ and $18^{th}$ combinations in even-numbered combinations of modulation and TBS index or odd-numbered combinations of modulation and TBS index, L1' combinations of modulation and TBS index in the first modulation and TBS index table in turn work as the first L1' combinations in the second modulation and TBS index table, next L2'-1 combinations following the first L1' combinations in the second modulation and TBS index table are combinations of M QAM and TBS index, and the TBS indexes of the last L3' combinations in the second modulation and TBS index table are default; L1', L2' and L3' are positive integers greater than 1, and M is a number greater than 64.

12. A coding and modulation processing method, comprising:

a UE receiving a high-layer configuration signaling transmitted by a base station, wherein the high-layer configuration signaling is used to indicate whether to support a high-order Quadrature Amplitude Modulation (QAM) modulation scheme, wherein the high-order QAM modulation scheme is a modulation scheme of M QAM and M is a number greater than 64;

wherein, after the UE receives the high-layer configuration signaling, the method further comprises:

the UE transmitting channel state information to the base station, wherein the channel state information at least comprises channel quality indication (CQI) information, and when the high-layer configuration signaling indicates not supporting the high-order QAM modulation scheme, the CQI information is obtained based on a first CQI table which does not support the high-order QAM modulation scheme, and when the high-layer configuration signaling indicates supporting the high-order QAM modulation scheme, the CQI information is obtained based on a second CQI table which supports the high-order QAM modulation scheme.

13. The method of claim 12, wherein, the high-layer configuration signaling is newly added.

14. The method of claim 12, wherein: when the modulation scheme of a last combination in the second CQI table is 256QAM, a code rate value r corresponding to the 256QAM is a real number between 0.92 and 0.96.

15. The method of claim 12, wherein: the first CQI table is a 4-bit CQI table in LTE Release 8; the second CQI table is formed with one of the following modes:

mode A1:

the CQI in the second CQI table has 16 values, that is, the CQI is represented by 4 bits, except L2 combinations of modulation scheme and code rate, L1 combinations of modulation scheme of code rate in the first CQI table in turn work as first L1 combinations of modulation and code rate in the second CQI table, and next L2 combinations of modulation scheme and code rate in the second CQI table are combinations of M QAM and code rate; L1 and L2 are positive integers greater than 1, and L1+L2=15, and M is a number greater than 64;

or, mode A2: the CQI in the second CQI table has 16 or 32 values, any combination of modulation scheme and code rate in the second CQI table is different from all combinations of modulation scheme and code rate in the first CQI table; alternatively, a first combination of modulation scheme and code rate in the second CQI table is same as a k-th combination of modulation scheme and code rate in the first CQI table, and other combinations of modulation scheme and code rate in the second CQI table are different from all combinations of modulation scheme and code rate in the first CQI table, k is a positive integer between 1 and 5;

or, mode A3: the CQI in the second CQI table has 32 values, first 13, 14 or 15 combinations in odd-numbered combinations of modulation scheme and code rate in the second CQI table are combinations of modulation scheme and code rate in the first CQI table.

16. The method of claim 15, wherein, the mode A1 comprises a mode A11 or a mode A12, wherein:

the mode A11 comprises that: except first L2' combinations of modulation scheme and code rate, L1' combinations of modulation scheme and code rate in the first CQI table in turn work as the first L1' combinations of modulation scheme and code rate in the second CQI table, and next L2' combinations of modulation scheme and code rate in the second CQI table are combinations of M QAM and code rate;

the mode A12 comprises that: except first L2' even-numbered combinations of modulation and code rate or odd-numbered combinations of modulation and code rate, L1' combinations in the first CQI table in turn work as the first L1' combinations in the second CQI table, last L2' combinations of modulation scheme and code rate in the second CQI table are combinations of M QAM and code rate; wherein, in the first CQI table, the odd-numbered combinations of modulation scheme and code rate refer to a set of $1^{st}$, $3^{rd}$, $5^{th}$, $7^{th}$, $9^{th}$, $11^{th}$ and $13^{th}$ combinations of modulation scheme and code rate, the even-numbered combinations of modulation scheme and code rate refer to a set of $2^{nd}$, $4^{th}$, $6^{th}$, $8^{th}$, $10^{th}$, $12^{th}$, $14^{th}$ combinations of modulation scheme and code rate, wherein, M is a number greater than 64, L1' and L2' are positive integers greater than 1.

17. The method of claim 12, wherein, after the UE receives the high-layer configuration signaling, the method further comprises:

the UE receiving a downlink control signaling transmitted by the base station, wherein the downlink control signaling at least comprises a modulation and coding scheme field ($I_{MCS}$) when the high-layer configuration signaling indicates not supporting the high-order QAM modulation scheme, then the modulation and coding scheme field ($I_{MCS}$) being determined based on a first modulation and transport block size (TBS) index table which does not support the high-order QAM modulation scheme; when the high-layer configuration signaling indicates supporting the high-order QAM modulation scheme, in combination with predefined information, determining whether the modulation and coding scheme field ($I_{MCS}$) is determined based on a second modulation and TBS index table which supports the high-order QAM modulation scheme.

18. The method of claim 17, wherein: the predefined information is at least one of the following: a search space, a downlink control information format, a Cyclic Redundancy Check (CRC) scrambling mode of downlink control information.

19. The method of claim 17, wherein:

the predefined information is a search space, and predefines that: when the high-layer configuration signaling indicates supporting the high-order QAM modulation scheme and it is in a public search space, the modulation and coding scheme field ($I_{MCS}$) is determined based on the first modulation and transport block size (TBS) index table which does not support the high-order QAM modulation scheme; when the high-layer configuration signaling indicates supporting the high-order QAM modulation scheme and it is in a UE-specific search space, the modulation and coding scheme field ($I_{MCS}$) is determined based on the second modulation and transport block size (TBS) index table which supports the high-order QAM modulation scheme;

or, the pre-defined information is the search space and the CRC scrambling mode corresponding to a downlink control information, and predefines that: when the high-order configuration signaling indicates supporting the high-order QAM modulation scheme and a Semi-Persistent Scheduling (SPS) Cell Radio Network Temporary Identifier (C-RNTI) scrambles CRC in the public search space or in the UE-specific search space, the modulation and coding scheme field ($I_{MCS}$) is determined based on the first modulation and transport block size (TBS) index table which does not support the high-order QAM modulation scheme; when the high-layer configuration signaling indicates supporting the high-order QAM modulation scheme and the C-RNTI scrambles the CRC in the UE-specific search space, the modulation and coding scheme field ($I_{MCS}$) is determined based on the second modulation and transport block size (TBS) index table which supports the high-order QAM modulation scheme.

20. The method of claim 17, wherein, the predefined information is a downlink control information format and predefines that: when the high-layer configuration signaling indicates supporting the high-order QAM modulation scheme and the downlink control information format is a format which is predefined as supporting the high-order QAM modulation scheme, then the modulation and coding scheme field ($I_{MCS}$) is determined based on the second modulation and transport block size (TBS) index table which supports the high-order QAM modulation scheme, when the high-layer configuration signaling indicates not supporting the high-order QAM modulation scheme or the downlink control information format is a format which is predefined as not supporting the high-order QAM modulation scheme, the modulation and coding scheme field ($I_{MCS}$) is determined based on the first modulation and transport block size (TBS) index table which does not support the high-order QAM modulation scheme.

21. The method of claim 17, wherein: the first modulation and TBS index table is a 5-bit modulation and TBS index table in LTE Release 8; the second modulation and TBS index table is formed with one of the following modes:

mode B1: there are 32 values in the second modulation and TBS index table, that is, a modulation and coding scheme (MCS) index is represented by 5 bits, except L2 combinations of modulation and TBS index, L1 combinations in the first modulation and TBS index table in turn work as first L1 combinations in the second modulation scheme and TBS index table, next L2-1 combinations just following the first L1 combinations in the second modulation and TBS index table are combinations of M QAM and TBS index, TBS indexes of last L3 combinations in the second modulation and TBS index table are default; L1, L2 and L3 are positive integers greater than 1, and L1+L2+L3-1=32, and M is a number greater than 64;

or, mode B2: there are 32 or 64 values in the second modulation and TBS index table, any combination of modulation scheme and TBS index in the second modulation and TBS index table is different from all combinations of modulation and TBS index in the first modulation and TBS index table; or, a first combination of modulation scheme and TBS index in the second modulation and TBS index table is same as a k-th combination in the first modulation and TBS index table, and TBS indexes of last four combinations in the second modulation and TBS index table are default, and others are different, k is a positive integer between 1 and 5;

or, mode B3: there are 64 values in the second modulation and TB S index table, first l odd-numbered or even-numbered combinations of modulation and TBS index in the second modulation and TBS index table are combinations of modulation and TBS index in the first modulation and TBS index table, where l is a positive integer between 20 and 29.

22. The method of claim 21, wherein: the mode B1 comprises a mode B11, a mode B12, a mode B13 or a mode B14, wherein:

the mode B11 comprises that: except first L2' combinations of modulation and TBS index, L1' combinations in the first modulation and TBS index table in turn work as the first L1' combinations in the second modulation scheme and TBS index table, next L2'-1 combinations in the second modulation and TBS index table are combinations of M QAM and TBS index, the TBS indexes of the last L3' combinations in the second modulation and TBS index table are default; L1', L2' and L3' are positive integers greater than 1, and M is a number greater than 64;

the mode B12 comprises that: except first L2' combinations in even-numbered combinations of modulation and TBS index or odd-numbered combinations of modulation and TBS index, L1' combinations in the first modulation scheme and TBS index table in turn work as the first L1' combinations in the second modulation and TBS index table, and next L2'-1 combinations in the second modulation and TBS index table are combinations of M QAM and TBS index, the TBS indexes of the last L3' combinations in the second modulation and TBS index table are default; L1', L2' and L3' are positive integers greater than 1, and M is a number greater than 64; wherein, in the first modulation and TBS index table, the odd-numbered combinations of modulation and TBS index refer to a set of $1^{st}$, $3^{rd}$, $5^{th}$, ..., $27^{th}$, $29^{th}$, combinations of modulation and TBS index, the even-numbered combinations of modulation and TBS index refer to a set of $2^{nd}$, $4^{th}$, $6^{th}$, ..., $28^{th}$ combinations of modulation and TBS index;

the mode B13 comprises that: except first L2'-2 combinations, one of $10^{th}$ and $11^{th}$ combinations, and one of $17^{th}$ and $18^{th}$ combinations, L1' combinations of modulation and TBS index in the first modulation and TBS index table in turn work as the first L1' combinations in the second modulation and TBS index table, next L2'-1 combinations following the first L1' combinations in the second modulation and TBS index table are combinations of M QAM and TBS index, and the TBS indexes of the last L3' combinations in the second modulation and TBS index table are default; L1', L2' and L3' are positive integers greater than 1, and M is a number greater than 64;

the mode B14 comprises that: except first L2'-2 combinations, one of $10^{th}$ and $11^{th}$ combinations, and one of $17^{th}$ and $18^{th}$ combinations in even-numbered combinations of modulation and TBS index or odd-numbered combinations of modulation and TBS index, L1' combinations of modulation and TBS index in the first modulation and TBS index table in turn work as the first L1' combinations in the second modulation and TBS index table, next L2'-1 combinations following the first L1' combinations in the second modulation and TBS index table are combinations of M QAM and TBS index, and the TBS indexes of the last L3' combinations in the second modulation and TBS index table are default; L1', L2' and L3' are positive integers greater than 1, and M is a number greater than 64.

23. A base station, comprising:
a configuration information transmitting unit, configured to: transmit a high-layer configuration signaling to a user equipment (UE), wherein the high-layer configuration signaling is used to indicate whether to support a high-order Quadrature Amplitude Modulation (QAM) modulation scheme, and the high-order QAM modulation scheme is a modulation scheme of M QAM, wherein M is a number greater than 64;

wherein, the base station further comprises:
a channel state information receiving unit, configured to receive channel state information of the UE, wherein the channel state information at least comprises channel quality indication (CQI) information, when the high-layer configuration signaling indicates not supporting the high-order QAM modulation scheme, the CQI information is obtained based on the first CQI table which does not support the high-order QAM modulation scheme, when the high-layer configuration signaling indicates supporting the high-order QAM modulation scheme, the CQI information is obtained based on the second CQI table which supports the high-order QAM modulation scheme.

24. The base station of claim 23, wherein, the high-layer configuration signaling is newly added.

25. The base station of claim 23, wherein: when a modulation scheme of a last combination in the second CQI table is 256QAM, a code rate value r corresponding to the 256QAM is a real number between 0.92 and 0.96.

26. The base station of claim 23, wherein: the first CQI table is a 4-bit CQI table in LTE Release 8; the second CQI table is formed with one of the following modes:
mode A1: the CQI in the second CQI table has 16 values, that is, the CQI is represented by 4 bits, except L2 combinations of modulation scheme and code rate, L1 combinations of modulation scheme and code rate in the first CQI table in turn work as first L1 combinations of modulation and code rate in the second CQI table, and next L2 combinations of modulation scheme and code rate in the second CQI table are combinations of M QAM and code rate; L1 and L2 are positive integers greater than 1, and L1+L2=15, and M is a number greater than 64;

or, mode A2: the CQI in the second CQI table has 16 or 32 values, any combination of modulation scheme and code rate in the second CQI table is different from all combinations of modulation scheme and code rate in the first CQI table; alternatively, a first combination of modulation scheme and code rate in the second CQI table is same as a k-th combination of modulation scheme and code rate in the first CQI table, and other combinations of modulation scheme and code rate in the second CQI table are different from all combinations of modulation scheme and code rate in the first CQI table, k is a positive integer between 1 and 5;

or, mode A3: the CQI in the second CQI table has 32 values, first 13, 14 or 15 combinations in odd-numbered combinations of modulation scheme and code rate in the second CQI table are combinations of modulation scheme and code rate in the first CQI table.

27. The base station of claim 26, wherein, the mode A1 comprises a mode A11 or a mode A12, wherein:
the mode A11 comprises that: except first L2' combinations of modulation scheme and code rate, L1' combinations of modulation scheme and code rate in the first CQI table in turn work as the first L1' combinations of modulation scheme and code rate in the second CQI table, and next L2' combinations of modulation scheme and code rate in the second CQI table are combinations of M QAM and code rate;

the mode A12 comprises that: except first L2' even-numbered combinations of modulation and code rate or odd-numbered combinations of modulation and code rate, L1' combinations in the first CQI table in turn work as the first L1' combinations in the second CQI table, last L2' combinations of modulation scheme and code rate in the second CQI table are combinations of M QAM and code rate; wherein, in the first CQI table, the odd-numbered combinations of modulation scheme and code rate refer to a set of $1^{st}$, $3^{rd}$, $5^{th}$, $7^{th}$, $9^{th}$, $11^{th}$, and $13^{th}$ combinations of modulation scheme and code rate, the even-numbered combinations of modulation scheme and code rate refer to a set of $2^{nd}$, $4^{th}$, $6^{th}$, $8^{th}$, $10^{th}$, $12^{th}$, $14^{th}$ combinations of modulation scheme and code rate, wherein, M is a number greater than 64, L1' and L2' are positive integers greater than 1.

28. The base station of claim 23, wherein, the base station further comprises:
  a downlink control information transmitting unit, configured to: transmit a downlink control signaling to the UE, wherein the downlink control signaling at least comprises a modulation and coding scheme field ($I_{MCS}$), when the high-layer configuration signaling indicates not supporting the high-order QAM modulation scheme, then the modulation and coding scheme field ($I_{MCS}$) is determined based on a first modulation and transport block size (TBS) index table which does not support the high-order QAM modulation scheme; when the high-layer configuration signaling indicates supporting the high-order QAM modulation scheme, in combination with predefined information, it is to determine whether the modulation and coding scheme field ($I_{MCS}$) is determined based on a second modulation and TBS index table which supports the high-order QAM.

29. The base station of claim 28, wherein: the predefined information is at least one of the following: a search space, a downlink control information format, a Cyclic Redundancy Check (CRC) scrambling mode of downlink control information.

30. The base station of claim 28, wherein:
  the predefined information is a search space, and predefines that: when the high-layer configuration signaling indicates supporting the high-order QAM modulation scheme and it is in a public search space, the modulation and coding scheme field ($I_{MCS}$) is determined based on the first modulation and transport block size (TBS) index table which does not support the high-order QAM modulation scheme; when the high-layer configuration signaling indicates supporting the high-order QAM modulation scheme and it is in a UE-specific search space, the modulation and coding scheme field ($I_{MCS}$) is determined based on the second modulation and transport block size (TBS) index table which supports the high-order QAM modulation scheme;
  or, the pre-defined information is the search space and the CRC scrambling mode corresponding to the downlink control information, and predefines that: when the high-order configuration signaling indicates supporting the high-order QAM modulation scheme and a Semi-Persistent Scheduling (SPS) Cell Radio Network Temporary Identifier (C-RNTI) scrambles CRC in the public search space or in the UE-specific search space, the modulation and coding scheme field ($I_{MCS}$) is determined based on the first modulation and transport block size (TBS) index table which does not support the high-order QAM modulation scheme, when the high-layer configuration signaling indicates supporting the high-order QAM modulation scheme and the C-RNTI scrambles the CRC in the UE-specific search space, the modulation and coding scheme field ($I_{MCS}$) is determined based on the second modulation and transport block size (TBS) index table which supports the high-order QAM modulation scheme.

31. The base station of claim 28, wherein, the predefined information is the downlink control information format and predefines that: when the high-layer configuration signaling indicates supporting the high-order QAM modulation scheme and the downlink control information format is a format which is predefined as supporting the high-order QAM modulation scheme, then the modulation and coding scheme field ($I_{MCS}$) is determined based on the second modulation and transport block size (TBS) index table which supports the high-order QAM modulation scheme, when the high-layer configuration signaling indicates not supporting the high-order QAM modulation scheme or the downlink control information format is a format which is predefined as not supporting the high-order QAM modulation scheme, the modulation and coding scheme field ($I_{MCS}$) is determined based on the first modulation and transport block size (TBS) index table which does not support the high-order QAM modulation scheme.

32. The base station of claim 28, wherein: the first modulation and TBS index table is a 5-bit modulation and TBS index table in LTE Release 8; the second modulation and TBS index table is formed with one of the following modes:
  mode B1 : there are 32 values in the second modulation and TBS index table, that is, an MCS index is represented by 5 bits, except L2 combinations of modulation and TBS index, L1 combinations in the first modulation and TBS index table in turn work as first Ll combinations in the second modulation scheme and TBS index table, next L2-1 combinations just following the first L1 combinations in the second modulation and TBS index table are combinations of M QAM and TBS index, TBS indexes of last L3 combinations in the second modulation and TBS index table are default; L1, L2 and L3 are positive integers greater than 1, and L1+L2+L3−1=32, wherein M is a number greater than 64;
  or, mode B2: there are 32 or 64 values in the second modulation and TBS index table, any combination of modulation scheme and TBS index in the second modulation and TBS index table is different from all combinations of modulation and TBS index in the first modulation and TBS index table; or, a first combination of modulation scheme and TBS index in the second modulation and TBS index table is same as a k-th combination in the first modulation and TBS index table, and TBS indexes of last four combinations in the second modulation and TBS index table are default, and others are different, k is a positive integer between 1 and 5;
  or, mode B3: there are 64 values in the second modulation and TB S index table, first l odd-numbered or even-numbered combinations of modulation and TBS index in the second modulation and TBS index table are combinations of modulation and TBS index in the first modulation and TBS index table, where l is a positive integer between 20 and 29.

33. The base station of claim 32, wherein: the mode B1 comprises a mode B11, a mode B12, a mode B13 or a mode B14, wherein:
  the mode B11 comprises that: except first L2' combinations of modulation and TBS index, L1' combinations in the first modulation and TBS index table in turn work as the first L1' combinations in the second modulation scheme and TBS index table, next L2'-1 combinations in the second modulation and TBS index table are combinations of M QAM and TBS index, the TBS indexes of the last L3' combinations in the second modulation and TBS index table are default; L1', L2' and L3' are positive integers greater than 1, and M is a number greater than 64;

the mode B12 comprises that: except first L2' combinations in even-numbered combinations of modulation and TBS index or odd-numbered combinations of modulation and TBS index, L1' combinations in the first modulation scheme and TBS index table in turn work as the first L1' combinations in the second modulation and TBS index table, and next L2'-1 combinations in the second modulation and TBS index table are combinations of M QAM and TBS index, the TBS indexes of the last L3' combinations in the second modulation and TBS index table are default; L1', L2' and L3' are positive integers greater than 1, and M is a number greater than 64; wherein, in the first modulation and TBS index table, the odd-numbered combinations of modulation and TBS index refer to a set of $1^{st}$, $3^{rd}$, $5^{th}$, ..., $27^{th}$, $29^{th}$ combinations of modulation and TBS index, the even-numbered combinations of modulation and TBS index refer to a set of $2^{nd}$, $4^{th}$, $6^{th}$, ..., $28^{th}$ combinations of modulation and TBS index;

the mode B13 comprises that: except first L2'-2 combinations, one of $10^{th}$ and $11^{th}$ combinations, and one of $17^{th}$ and $18^{th}$ combinations, L1' combinations of modulation and TBS index in the first modulation and TBS index table in turn work as the first L1' combinations in the second modulation and TBS index table, next L2'-1 combinations following the first L1' combinations in the second modulation and TBS index table are combinations of M QAM and TBS index, and the TBS indexes of the last L3' combinations in the second modulation and TBS index table are default; L1', L2' and L3' are positive integers greater than 1, and M is a number greater than 64;

the mode B14 comprises that: except first L2'-2 combinations, one of $10^{th}$ and $11^{th}$ combinations, and one of $17^{th}$ and $18^{th}$ combinations in even-numbered combinations of modulation and TBS index or odd-numbered combinations of modulation and TBS index, L1' combinations of modulation and TBS index in the first modulation and TBS index table in turn work as the first L1' combinations in the second modulation and TBS index table, next L2'-1 combinations following the first L1' combinations in the second modulation and TBS index table are combinations of M QAM and TBS index, and the TBS indexes of the last L3' combinations in the second modulation and TBS index table are default; L1', L2' and L3' are positive integers greater than 1, and M is a number greater than 64.

34. A user equipment (UE), wherein, the UE comprises:
a configuration information receiving unit, configured to receive a high-layer configuration signaling transmitted by a base station, wherein the high-layer configuration signaling is used to indicate whether to support a high-order Quadrature Amplitude Modulation (QAM) modulation scheme, and the high-order QAM modulation scheme is a modulation scheme of M QAM, wherein M is a number greater than 64;

wherein, the UE further comprises:
a channel state information reporting unit, configured to: transmit channel state information to the base station, wherein the channel state information comprises at least channel quality indication (CQI) information, and when the high-layer configuration signaling indicates not supporting the high-order QAM modulation scheme, the CQI information is obtained based on a first CQI table which does not support the high-order QAM modulation scheme, and when the high-layer configuration signaling indicates supporting the high-order QAM modulation scheme, the CQI information is obtained based on a second CQI table which supports the high-order QAM modulation scheme.

35. The UE of claim 34, wherein, the high-layer configuration signaling is newly added.

36. The UE of claim 34, wherein: when a modulation scheme of a last combination in the second CQI table is 256QAM, a code rate value r corresponding to the 256QAM is a real number between 0.92 and 0.96.

37. The UE of claim 34, wherein: the first CQI table is a 4-bit CQI table in LTE Release 8; the second CQI table is formed with one of the following modes:

mode A1: the CQI in the second CQI table has 16 values, that is, the CQI is represented by 4 bits, except L2 combinations of modulation scheme and code rate, L1 combinations of modulation scheme and code rate in the first CQI table in turn work as first L1 combinations of modulation and code rate in the second CQI table, and next L2 combinations of modulation scheme and code rate in the second CQI table are combinations of M QAM and code rate; L1 and L2 are positive integers greater than 1, and L1+L2=15, and M is a number greater than 64;

or, mode A2: the CQI in the second CQI table has 16 or 32 values, any combination of modulation scheme and code rate in the second CQI table is different from all combinations of modulation scheme and code rate in the first CQI table; alternatively, a first combination of modulation scheme and code rate in the second CQI table is same as a k-th combination of modulation scheme and code rate in the first CQI table, and other combinations of modulation scheme and code rate in the second CQI table are different from all combinations of modulation scheme and code rate in the first CQI table, k is a positive integer between 1 and 5;

or, mode A3: the CQIs in the second CQI table has 32 values, first 13, 14 or 15 combinations in odd-numbered combinations of modulation scheme and code rate in the second CQI table are combinations of modulation scheme and code rate in the first CQI table.

38. The UE of claim 37, wherein, the mode A1 comprises a mode A11 or a mode A12, wherein:

the mode A11 comprises that: except first L2' combinations of modulation scheme and code rate, L1' combinations of modulation scheme and code rate in the first CQI table in turn work as the first L1' combinations of modulation scheme and code rate in the second CQI table, and next L2' combinations of modulation scheme and code rate in the second CQI table are combinations of M QAM and code rate;

the mode A12 comprises that: except first L2' even-numbered combinations of modulation and code rate or odd-numbered combinations of modulation and code rate, L1' combinations in the first CQI table in turn work as the first L1' combinations in the second CQI table, last L2' combinations of modulation scheme and code rate in the second CQI table are combinations of M QAM and code rate; wherein, in the first CQI table, the odd-numbered combinations of modulation scheme and code rate refer to a set of $1^{st}$, $3^{rd}$, $5^{th}$, $7^{th}$, $9^{th}$, $11^{th}$ and $13^{th}$ combinations of modulation scheme and code rate, the even-numbered combinations of modulation scheme and code rate refer to a set of $2^{nd}$, $4^{th}$, $6^{th}$, $8^{th}$, $10^{th}$, $12^{th}$, $14^{th}$ combinations of modulation scheme and code rate, wherein, M is a number greater than 64, L1' and L2' are positive integers greater than 1.

39. The UE of claim 34, wherein, the UE further comprises:
a downlink control information receiving and detecting unit, configured to: receive and detect a downlink control signaling transmitted by the base station, wherein the downlink control signaling at least comprises a modulation and coding scheme field ($I_{MCS}$), when the high-layer configuration signaling indicates not supporting the high-order QAM, then the modulation and coding scheme field ($I_{MCS}$) is determined based on a first modulation and transport block size (TBS) index table which does not support the high-order QAM modulation scheme; when the high-layer configuration signaling indicates supporting the high-order QAM modulation scheme, in combination with predefined information, it is to determine whether the modulation and coding scheme field ($I_{MCS}$) is determined based on a second modulation and TBS index table which supports the high-order QAM modulation scheme.

40. The UE of claim 39, wherein: the predefined information is at least one of the following: a search space, a downlink control information format, a Cyclic Redundancy Check (CRC) scrambling mode of a downlink control information.

41. The UE of claim 39, wherein:
the predefined information is a search space, and predefines that: when the high-layer configuration signaling indicates supporting the high-order QAM modulation scheme and it is in a public search space, the modulation and coding scheme field ($I_{MCS}$) is determined based on the first modulation and transport block size (TBS) index table which does not support the high-order QAM modulation scheme; when the high-layer configuration signaling indicates supporting the high-order QAM modulation scheme and it is in a UE-specific search space, the modulation and coding scheme field ($I_{MCS}$) is determined based on the second modulation and transport block size (TBS) index table which supports the high-order QAM modulation scheme;
or, the pre-defined information is the search space and the CRC scrambling mode corresponding to a downlink control information, and predefines that: when the high-layer configuration signaling indicates supporting the high-order QAM modulation scheme and a Semi-Persistent Scheduling (SPS) Cell Radio Network Temporary Identifier (C-RNTI) scrambles CRC in the public search space or in the UE-specific search space, the modulation and coding scheme field ($I_{MCS}$) is determined based on the first modulation and transport block size (TBS) index table which does not support the high-order QAM modulation scheme; when the high-layer configuration signaling indicates supporting the high-order QAM modulation scheme and the C-RNTI scrambles the CRC in the UE-specific search space, the modulation and coding scheme field ($I_{MCS}$) is determined based on the second modulation and transport block size (TBS) index table which supports the high-order QAM modulation scheme.

42. The UE of claim 39, wherein, the predefined information is a downlink control information format and predefines that: when the high-layer configuration signaling indicates supporting the high-order QAM modulation scheme and the downlink control information format is a format which is predefined as supporting the high-order QAM modulation scheme, then the modulation and coding scheme field ($I_{MCS}$) is determined based on the second modulation and transport block size (TBS) index table which supports the high-order QAM modulation scheme, when the high-layer configuration signaling indicates not supporting the high-order QAM modulation scheme and the downlink control information format is a format which is predefined as not supporting the high-order QAM modulation scheme, the modulation and coding scheme field ($I_{MCS}$) is determined based on the first modulation and transport block size (TBS) index table which does not support the high-order QAM modulation scheme.

43. The UE of claim 39, wherein: the first modulation and TBS index table is a 5-bit modulation and TBS index table in LTE Release 8; the second modulation and TBS index table is formed with one of the following modes:
mode B1: there are 32 values in the second modulation and TBS index table, that is, the modulation and coding scheme (MCS) index is represented by 5 bits, except L2 combinations of modulation and TBS index, L1 combinations in the first modulation and TBS index table in turn work as first L1 combinations in the second modulation scheme and TBS index table, next L2-1 combinations just following the first L1 combinations in the second modulation and TBS index table are combinations of M QAM and TBS index, TBS indexes of last L3 combinations in the second modulation and TBS index table are default; L1, L2 and L3 are positive integers greater than 1, and L1+L2+L3−1=32, and M is a number greater than 64;
or, mode B2: there are 32 or 64 values in the second modulation and TBS index table, any combination of modulation scheme and TBS index in the second modulation and TBS index table is different from all combinations of modulation and TBS index in the first modulation and TBS index table; or, a first combination of modulation scheme and TBS index in the second modulation and TBS index table is same as a k-th combination in the first modulation and TBS index table, and TBS indexes of last four combinations in the second modulation and TBS index table are default, and others are different, k is a positive integer between 1 and 5;
or, mode B3: there are 64 values in the second modulation and TBS index table, first l odd-numbered or even-numbered combinations of modulation and TBS index in the second modulation and TBS index table are combinations of modulation and TBS index in the first modulation and TBS index table, where l is a positive integer between 20 and 29.

44. The UE of claim 43, wherein: the mode B1 comprises a mode B11, a mode B12, a mode B13 or a mode B14, wherein:
the mode B11 comprises that: except first L2' combinations of modulation and TBS index, L1' combinations in the first modulation and TBS index table in turn work as the first L1' combinations in the second modulation scheme and TBS index table, next L2'-1 combinations in the second modulation and TBS index table are combinations of M QAM and TBS index, the TBS indexes of the last L3' combinations in the second modulation and TBS index table are default; L1', L2' and L3' are positive integers greater than 1, and M is a number greater than 64;

the mode B12 comprises that: except first L2' combinations in even-numbered combinations of modulation and TBS index or odd-numbered combinations of modulation and TBS index, L1' combinations in the first modulation scheme and TBS index table in turn work as the first L1' combinations in the second modulation and TBS index table, and next L2'-1 combinations in the second modulation and TBS index table are combinations of M QAM and TBS index, the TBS indexes of the last L3' combinations in the second modulation and TBS index table are default; L1', L2' and L3' are positive integers greater than 1, and M is a number greater than 64; wherein, in the first modulation and TBS index table, the odd-numbered combinations of modulation and TBS index refer to a set of $1^{st}$, $3^{rd}$, $5^{th}$, ..., $27^{th}$, $29^{th}$, combinations of modulation and TBS index, the even-numbered combinations of modulation and TBS index refer to a set of $2^{nd}$, $4^{th}$, $6^{th}$, ..., $28^{th}$ combinations of modulation and TBS index;

the mode B13 comprises that: except first L2'-2 combinations, one of $10^{th}$ and $11^{th}$ combinations, and one of $17^{th}$ and $18^{th}$ combinations, L1' combinations of modulation and TBS index in the first modulation and TBS index table in turn work as the first L1' combinations in the second modulation and TBS index table, next L2'-1 combinations following the first L1' combinations in the second modulation and TBS index table are combinations of M QAM and TBS index, and the TBS indexes of the last L3' combinations in the second modulation and TBS index table are default; L1', L2' and L3' are positive integers greater than 1, and M is a number greater than 64;

the mode B14 comprises that: except first L2'-2 combinations, one of $10^{th}$ and $11^{th}$ combinations, and one of $17^{th}$ and $18^{th}$ combinations in even-numbered combinations of modulation and TBS index or odd-numbered combinations of modulation and TBS index, L1' combinations of modulation and TBS index in the first modulation and TBS index table in turn work as the first L1' combinations in the second modulation and TBS index table, next L2'-1 combinations following the first L1' combinations in the second modulation and TBS index table are combinations of M QAM and TBS index, and the TBS indexes of the last L3' combinations in the second modulation and TBS index table are default; L1', L2' and L3' are positive integers greater than 1, and M is a number greater than 64.

* * * * *